US012617728B2

(12) United States Patent
Li et al.

(10) Patent No.: US 12,617,728 B2
(45) Date of Patent: May 5, 2026

(54) CaO—ZrO₂ COMPOSITION, METHOD FOR PRODUCING CaO—ZrO₂ COMPOSITION, AND CaO—ZrO₂-CONTAINING REFRACTORY MATERIAL AND CASTING NOZZLE

(71) Applicant: KROSAKIHARIMA CORPORATION, Fukuoka (JP)

(72) Inventors: Ling Li, Fukuoka (JP); Katsumi Morikawa, Fukuoka (JP); Akinari Sasaki, Fukuoka (JP); Shigefumi Matsumoto, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 1051 days.

(21) Appl. No.: 17/770,387

(22) PCT Filed: Oct. 23, 2020

(86) PCT No.: PCT/JP2020/039864
§ 371 (c)(1),
(2) Date: Apr. 20, 2022

(87) PCT Pub. No.: WO2021/085325
PCT Pub. Date: May 6, 2021

(65) Prior Publication Data
US 2022/0388910 A1      Dec. 8, 2022

(30) Foreign Application Priority Data
Oct. 31, 2019    (JP) ................................. 2019-199208

(51) Int. Cl.
*C04B 35/484*      (2006.01)
*B22D 11/10*       (2006.01)
(Continued)

(52) U.S. Cl.
CPC ............ *C04B 35/484* (2013.01); *B22D 11/10* (2013.01); *C04B 35/057* (2013.01);
(Continued)

(58) Field of Classification Search
CPC ................ C04B 35/484; C04B 35/057; C04B 2235/3208; C04B 2235/3244
See application file for complete search history.

(56) References Cited

U.S. PATENT DOCUMENTS 5,151,201 A      9/1992  Fishler
9,221,099 B2    12/2015  Morikawa
(Continued)

FOREIGN PATENT DOCUMENTS

JP      6-56523 A      3/1994
JP      11-10321 A     1/1999
(Continued)

OTHER PUBLICATIONS

Maya, Juan C., et al. "Effect of the CaO sintering on the calcination rate of CaCO3 under atmospheres containing CO2." AIChE Journal 64.10 (2018): 3638-3648. (Year: 2018).*
(Continued)

*Primary Examiner* — Amber R Orlando
*Assistant Examiner* — Cameron K Miller
(74) *Attorney, Agent, or Firm* — Fleit Intellectual Property Law; Paul D. Bianco

(57) ABSTRACT

Provided is a ZrO₂—CaO—C based refractory material which is capable of maintaining high adhesion resistance over a long period of time, while exhibiting significant slaking resistance, and suppressing self-fluxing, i.e., exhibiting corrosion-erosion resistance. The refractory material comprises a CaO—ZrO₂ composition containing a CaO component in an amount of 40% by mass to 60% by mass, wherein a mass ratio of the CaO component to a ZrO₂
(Continued)

CaO · ZrO₂ crystal (white area)

CaO crystal layer (black area)

component is 0.67 to 1.5, and wherein the $CaO-ZrO_2$ composition includes a eutectic microstructure of CaO crystals and $CaZrO_3$ crystals, wherein a width of each of the CaO crystals observable in a cross-sectional microstructure is 50 μm or less.

5 Claims, 19 Drawing Sheets

(51) Int. Cl.

| | | |
|---|---|---|
| *C04B 35/057* | (2006.01) | |
| *C04B 35/653* | (2006.01) | |
| *C04B 41/50* | (2006.01) | |
| *C04B 41/87* | (2006.01) | |

(52) U.S. Cl.
CPC .......... *C04B 35/653* (2013.01); *C04B 41/501* (2013.01); *C04B 41/87* (2013.01); *C04B 2235/3208* (2013.01); *C04B 2235/3244* (2013.01); *C04B 2235/442* (2013.01); *C04B 2235/549* (2013.01)

(56) References Cited

U.S. PATENT DOCUMENTS

| | | | |
|---|---|---|---|
| 2004/0009863 A1* | 1/2004 | Furuse | ................. C04B 35/465 |
| | | | 501/5 |
| 2013/0334263 A1 | 12/2013 | Morikawa | |

FOREIGN PATENT DOCUMENTS

| | | |
|---|---|---|
| JP | 2003-040672 A | 2/2003 |
| JP | 2009243723 A | 10/2009 |
| JP | 2010-167481 A | 8/2010 |
| WO | 2013/081113 A1 | 6/2013 |

OTHER PUBLICATIONS

International Search Report dated Nov. 12, 2020, for PCT/JP2020/039864.

Stubican et al, Phase Equilibria and Ordering in the System $ZrO_2$—CaO, Journal of the American Ceramic Society, 1977, vol. 60, p. 534-537.

International Preliminary Report on Patentability with Written Opinion, dated May 3, 2022 , for PCT/JP2020/039864 (English translation).

* cited by examiner

CaO · ZrO$_2$ crystal (white area)

CaO crystal layer (black area)

CaZrO$_3$ crystal

CaO crystal layer

Carbonaceous matrix

Void layer

Continuous film

CaO-ZrO$_2$ composition (particle)

CaO crystal

Width of CaO crystal

CaZrO$_3$ crystal

CaZrO$_3$ crystal

CaO crystal

Width of CaO crystal

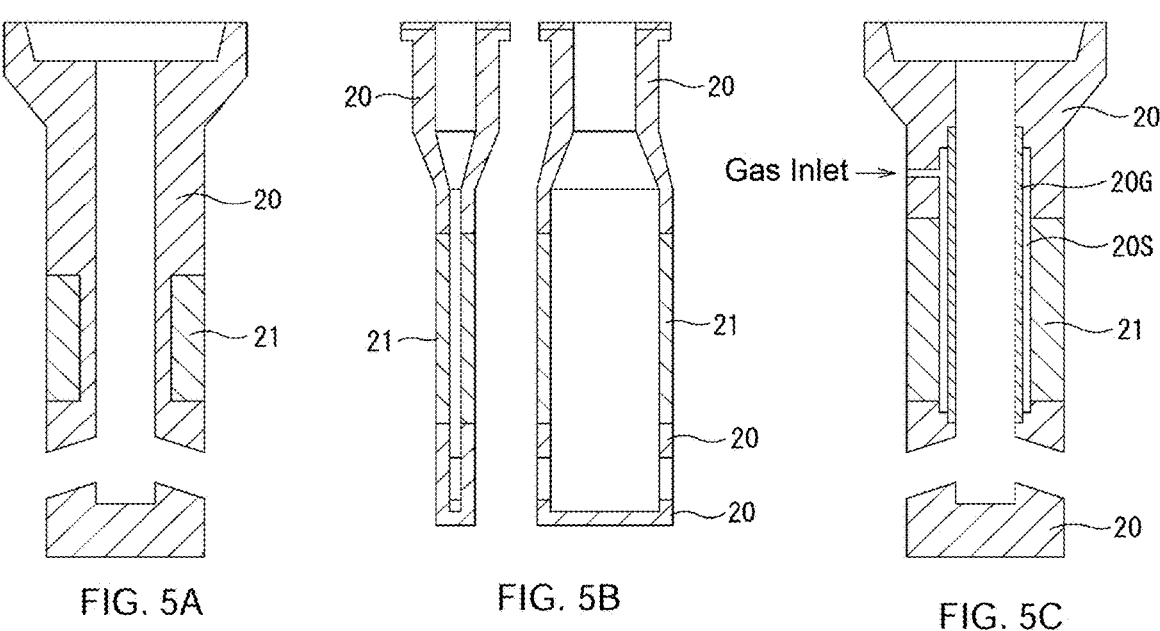
FIG. 5A                    FIG. 5B                    FIG. 5C
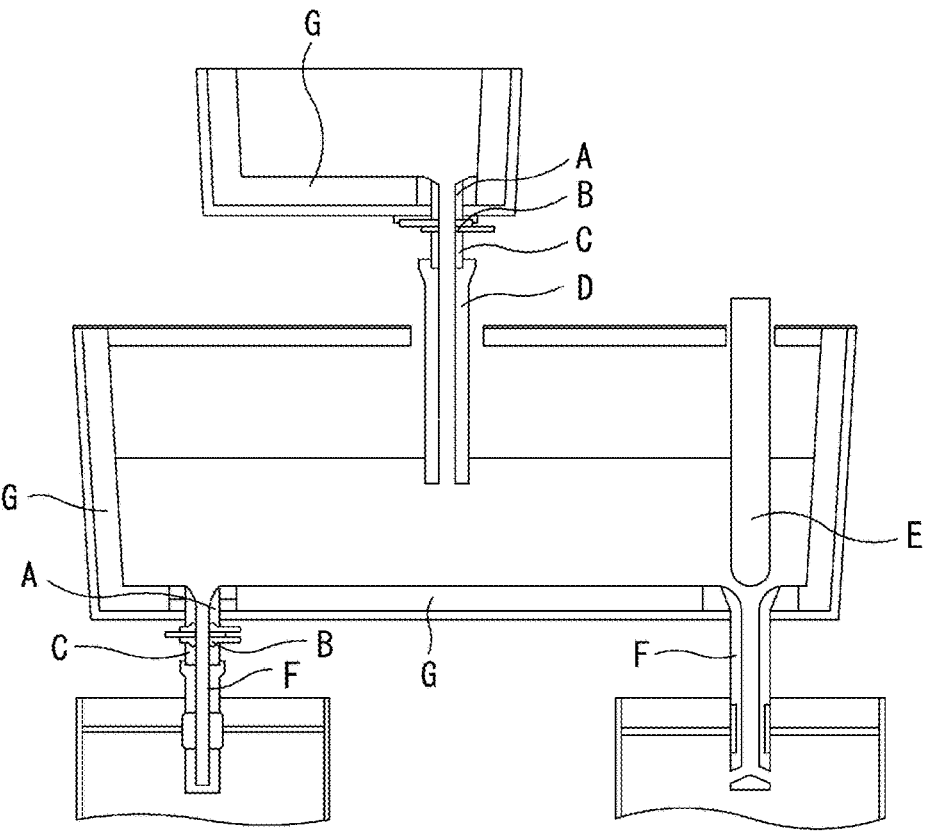
FIG. 6

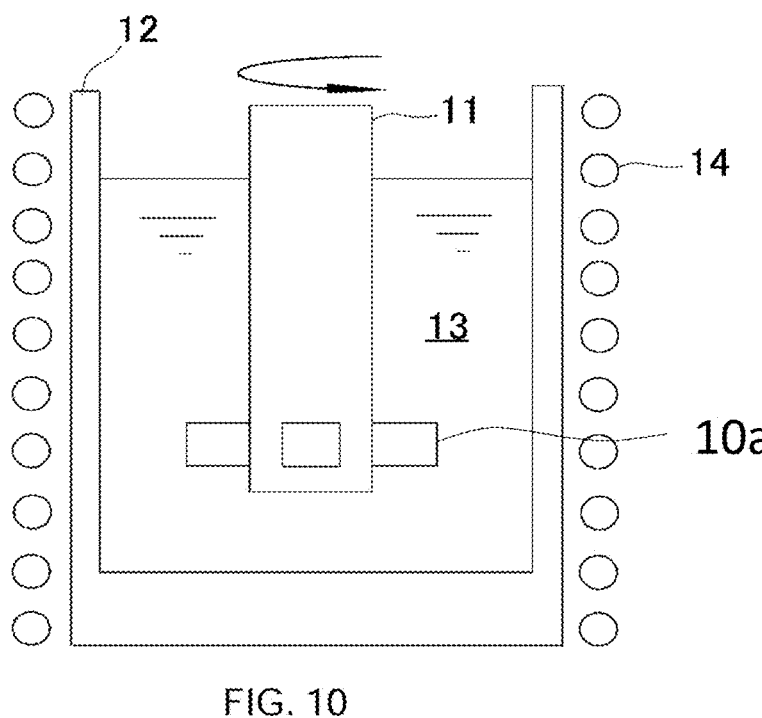
FIG. 10
FIG. 11A
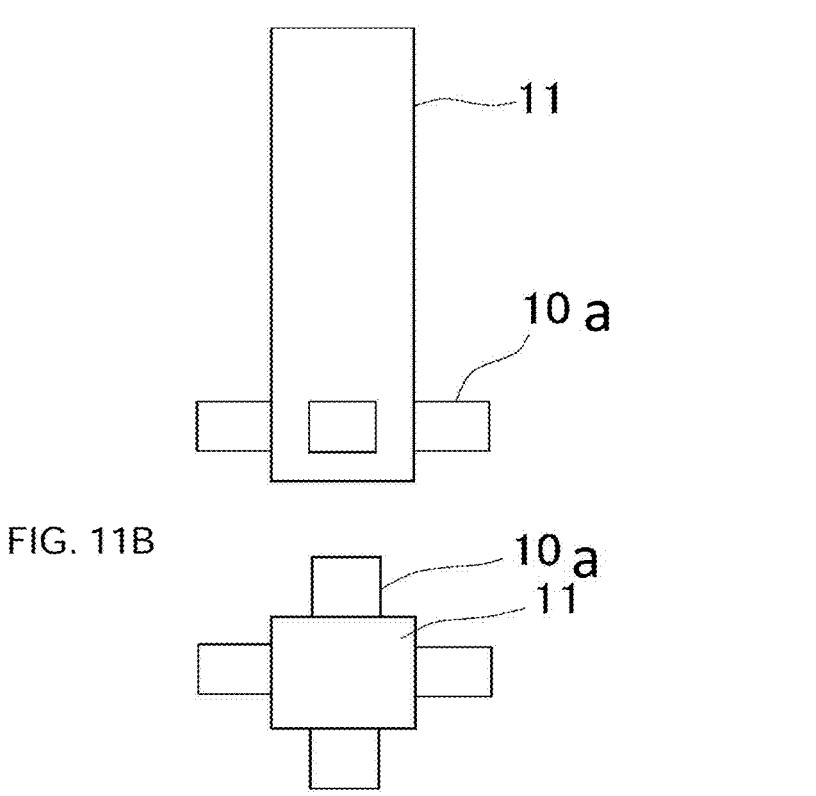
FIG. 11B

FIG. 12A
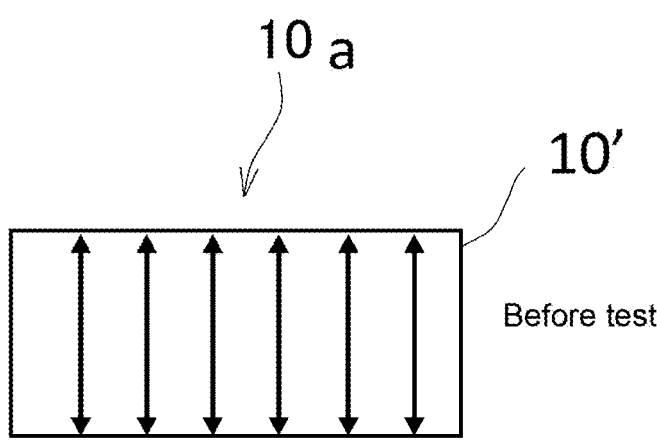
Before test
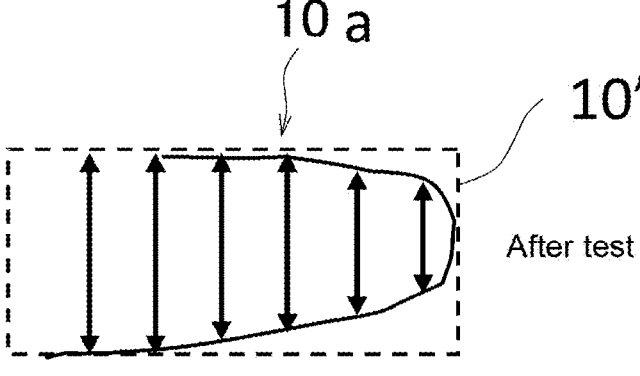
After test
FIG. 12B

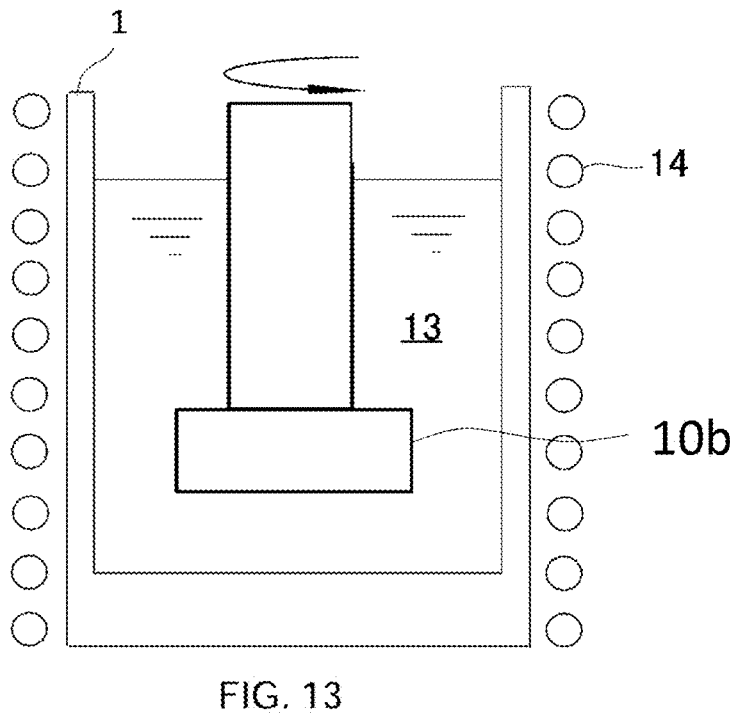
FIG. 13
FIG. 14A
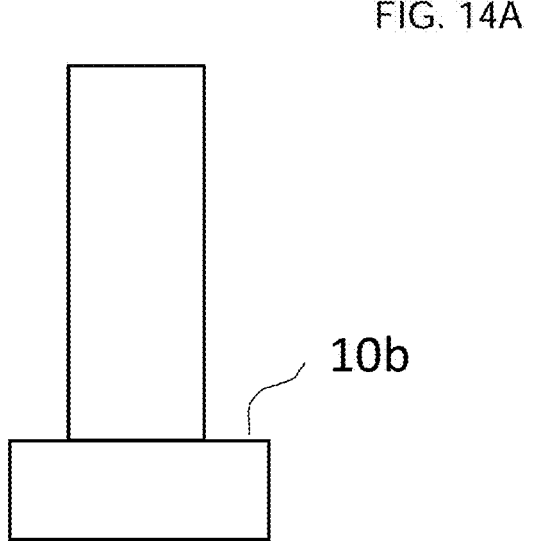
FIG. 14B
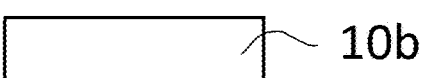

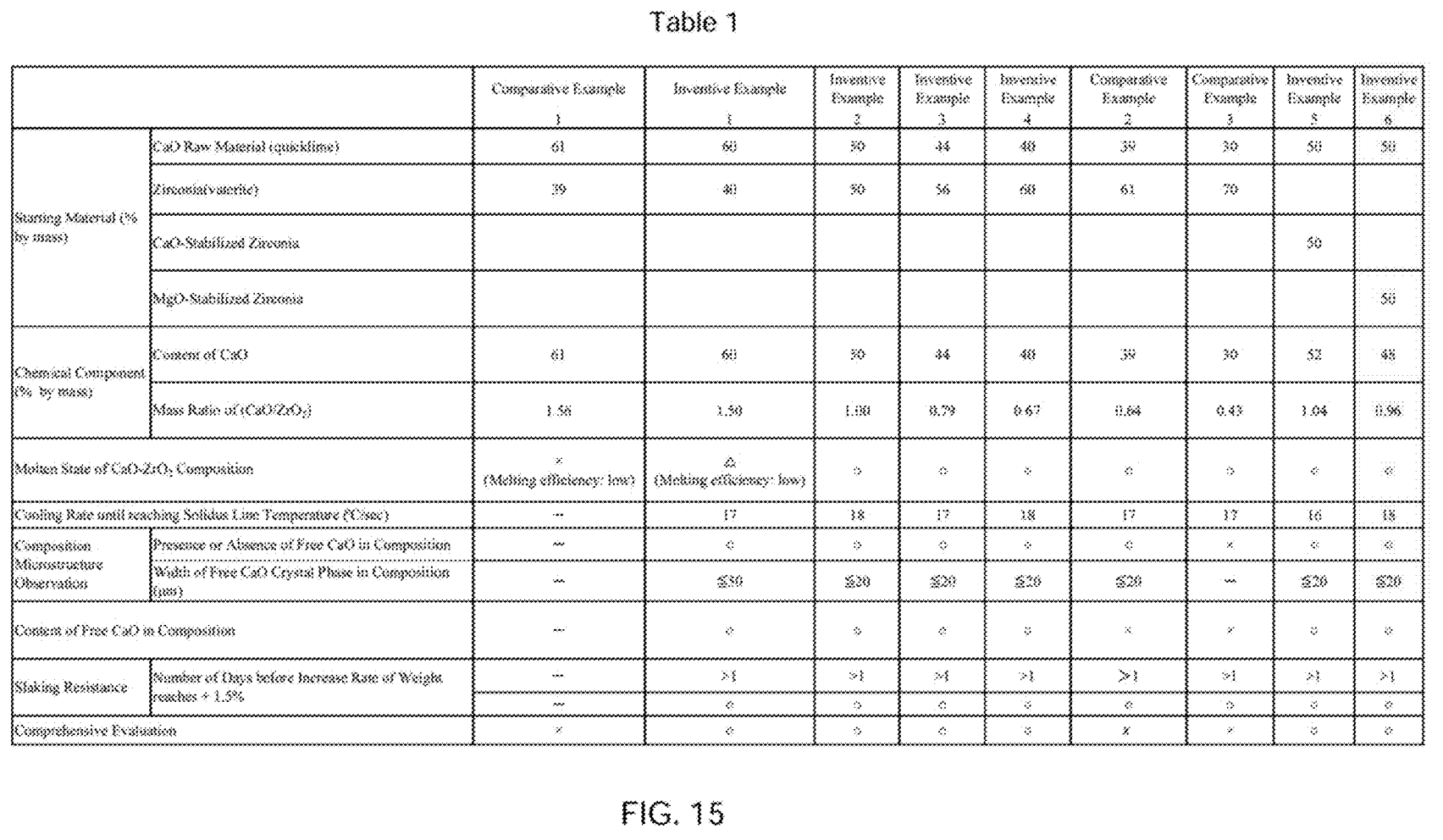

Table 1

| | Comparative Example 1 | Inventive Example 1 | Inventive Example 2 | Inventive Example 3 | Inventive Example 4 | Comparative Example 2 | Comparative Example 3 | Inventive Example 5 | Inventive Example 6 |
|---|---|---|---|---|---|---|---|---|---|
| Starting Material (% by mass) — CaO Raw Material (quicklime) | 61 | 60 | 50 | 44 | 48 | 38 | 30 | 50 | 50 |
| Starting Material (% by mass) — Zirconia(wustirte?) | 39 | 40 | | | | 61 | 70 | | |
| Chemical Component (% by mass) — CaO-Stabilized Zirconia | | | | | | | | 50 | |
| Chemical Component (% by mass) — MgO-Stabilized Zirconia | | | | | | | | | 50 |
| Chemical Component (% by mass) — Content of CaO | 61 | 60 | 50 | 44 | 48 | 38 | 30 | 53 | 48 |
| Chemical Component (% by mass) — Mass Ratio of (CaO/ZrO₂) | 1.56 | 1.50 | 1.00 | 0.79 | 0.67 | 0.64 | 0.43 | 1.04 | 0.96 |
| Molten State of CaO-ZrO₂ Composition | x (Melting efficiency: low) | △ (Melting efficiency: low) | ○ | ○ | ○ | ○ | ○ | ○ | ○ |
| Cooling Rate until reaching Solidus Line Temperature (°C/sec) | - | 17 | 18 | 17 | 18 | 17 | 17 | 18 | 18 |
| Composition Microstructure Observation — Presence or Absence of Free CaO in Composition | x | ○ | ○ | ○ | ○ | x | x | x | x |
| Composition Microstructure Observation — Width of Free CaO Crystal Phase in Composition (um) | - | 620 | 620 | 620 | 620 | 620 | - | 620 | 620 |
| Content of Free CaO in Composition | - | ○ | ○ | ○ | ○ | x | x | ○ | ○ |
| Slaking Resistance — Number of Days before Increase Rate of Weight reaches +1.5% | - | >7 | >7 | >7 | >7 | >7 | >7 | >7 | >7 |
| Comprehensive Evaluation | x | ○ | ○ | ○ | ○ | x | x | ○ | ○ |

FIG. 15

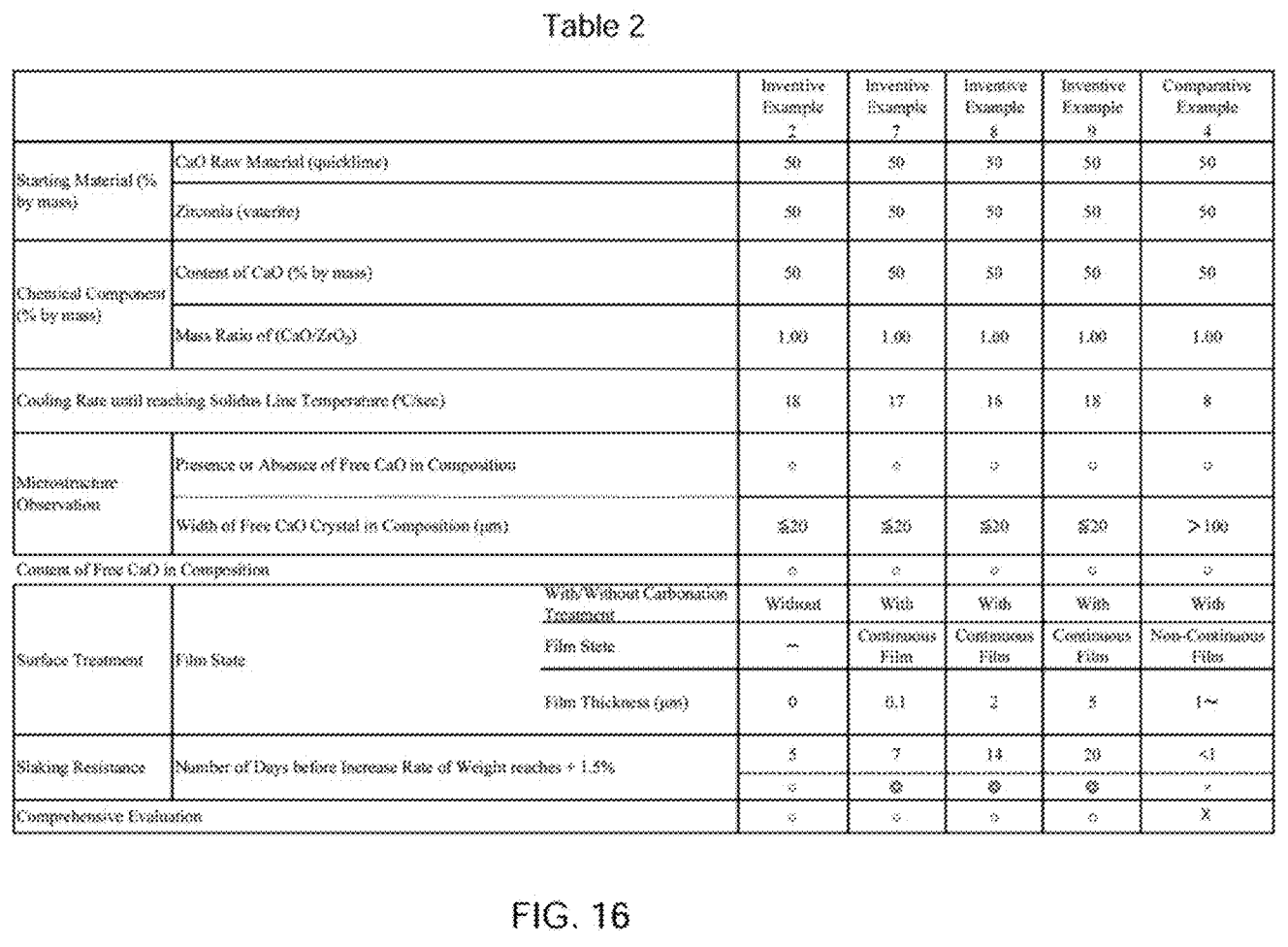

Table 2

| | | Inventive Example 1 | Inventive Example 2 | Inventive Example 3 | Inventive Example 4 | Comparative Example 4 |
|---|---|---|---|---|---|---|
| Starting Material (% by mass) | CaO Raw Material (quicklime) | 50 | 50 | 50 | 50 | 50 |
| | Zirconia (calcia) | 50 | 50 | 50 | 50 | 50 |
| Chemical Composition (% by mass) | Content of CaO (% by mass) | 50 | 50 | 50 | 50 | 50 |
| | Mass Ratio of ($CaO/ZrO_2$) | 1.00 | 1.00 | 1.00 | 1.00 | 1.00 |
| Cooling Rate until reaching Solidus Line Temperature (°C/sec) | | 18 | 17 | 16 | 15 | 8 |
| Microstructure Observation | Presence or Absence of Free CaO in Composition | o | o | o | o | o |
| | Width of Free CaO Crystal in Composition (μm) | ≤20 | ≤20 | ≤20 | ≤20 | >100 |
| Content of Free CaO in Composition | | o | o | o | o | o |
| Surface Treatment | With/Without Carbonation Treatment | Without | With | With | With | With |
| | Film State | - | Continuous Film | Continuous Film | Continuous Film | Non-Continuous Film |
| | Film Thickness (μm) | 0 | 0.1 | 3 | 8 | 12 |
| Baking Resistance | Number of Days before Increase Rate of Weight reaches +1.5% | 5 | 7 | 14 | 20 | <1 |
| Comprehensive Evaluation | | o | ⊚ | ⊚ | o | × |

FIG. 16

Table 3

| | | Inventive Example 10 | Inventive Example 2 | Inventive Example 11 | Comparative Example 5 |
|---|---|---|---|---|---|
| Starting Material (% by mass) | CaO Raw Material (quicklime) | 50 | 50 | 50 | 50 |
| | Zirconia (vaterite) | 50 | 50 | 50 | 50 |
| Chemical Component (% by mass) | Content of CaO | 50 | 50 | 50 | 50 |
| | Mass Ratio of (CaO/ZrO$_2$) | 1.00 | 1.00 | 1.00 | 1.00 |
| Cooling Rate until reaching Solidus Line Temperature (°C/sec) | | 25 | 18 | 10 | 8 |
| Microstructure Observation | Width of Free CaO Crystal in Composition (μm) | ≤10 | ≤20 | ≤50 | >50 |
| Slaking Resistance | Number of Days before Increase Rate of Weight reaches ÷ 1.5% | 7 | 5 | 3 | <1 |
| | | ◎ | ○ | △ | × |
| Comprehensive Evaluation | | ○ | ○ | ○ | × |

FIG. 17

Table 4

| | | Inventive Example 12 | Inventive Example 13 | Inventive Example 14 | Comparative Example 6 |
|---|---|---|---|---|---|
| Starting Material (% by mass) | CaO Raw Material (quicklime) 3mm or less | 50 | | | |
| | CaO Raw Material (quicklime) greater than 3mm to 5mm | | 50 | | |
| | CaO Raw Material (quicklime) greater than 5mm to 10mm | | | 50 | |
| | CaO Raw Material (quicklime) greater than 10mm | | | | 50 |
| | Zirconia (vaterite) 10mm or less | | | | 50 |
| Chemical Component (% by mass) | Content of CaO | 50 | 50 | 50 | 50 |
| | Mass Ratio of ($CaO/ZrO_2$) | 1.00 | 1.00 | 1.00 | 1.00 |
| Cooling Rate until reaching Solidus Line Temperature (°C/sec) | | 18 | 18 | 18 | 9 |
| Microstructure Observ Width of Free Crystal Phase in Composition (μm) | | ≤10 | ≤20 | ≤50 | >50 |
| Slaking Resistance Number of Days before Increase Rate of Weight reaches + 1.5% | | 7 | 5 | 3 | <1 |
| Slaking Resistance | | ◎ | ○ | △ | × |
| Comprehensive Evaluation | | ○ | ○ | ○ | × |

FIG. 18

Table 5

| Refractory Raw Material Composition (% by mass) | Particle size | Inventive Example 15 | Inventive Example 16 | Inventive Example 17 | Inventive Example 18 | Comparative Example 7 | Inventive Example 19 | Inventive Example 20 |
|---|---|---|---|---|---|---|---|---|
| CaO-ZrO₂ particles (CaO 60%, ZrO₂ 40%) | greater than 1mm to 1mm | 45 | | | | | 40 | |
| CaO-ZrO₂ particles (CaO 60%, ZrO₂ 40%) | 0.1mm or less | 45 | | | | | 40 | |
| CaO-ZrO₂ particles (CaO 50%, ZrO₂ 50%) | greater than 0.1mm to 3mm | | 45 | | | | | |
| CaO-ZrO₂ particles (CaO 50%, ZrO₂ 50%) | 0.1mm or less | | 45 | | | | | |
| CaO-ZrO₂ particles (CaO 44%, ZrO₂ 56%) | greater than 0.1mm to 1 mm | | | 45 | | | | |
| CaO-ZrO₂ particles (CaO 44%, ZrO₂ 56%) | 0.1mm or less | | | 45 | | | | |
| CaO-ZrO₂ particles (CaO 40%, ZrO₂ 60%) | greater than 0.1mm to 1mm | | | | 45 | | | 37 |
| CaO-ZrO₂ particles (CaO 40%, ZrO₂ 60%) | 0.1mm or less | | | | 45 | | | 38 |
| CaO-ZrO₂ particles (CaO 30%, ZrO₂ 70%) | greater than 0.1mm to 1 mm | | | | | 45 | | |
| CaO-ZrO₂ particles (CaO 30%, ZrO₂ 70%) | 0.1mm or less | | | | | 45 | | |
| Zirconia (unstabilized) | 1mm or less | | | | | | 10 | 15 |
| zirconia (CaO 4%) | 1mm or less | | | | | | | |
| CaO composition (quicklime) | 1mm or less | | | | | | | |
| Dolomite (CaO 60%) | 1mm or less | | | | | | | |
| Graphite | 0.5mm or less | 10 | 10 | 10 | 10 | 10 | 10 | 10 |
| Phenol Resin (% by mass, with respect to and in addition to total amount) | | 4 | 4 | 4 | 4 | 4 | 4 | 4 |
| With or without of Carbonation Treatment | | With | With | With | With | With | With | With |
| Chemical Component — Carbon (% by mass, with respect to total amount) | | 11.8 | 11.8 | 11.8 | 11.8 | 11.8 | 11.8 | 11.8 |
| Chemical Component — CaO (% by mass, with respect to total amount) | | 52.9 | 44.1 | 38.9 | 35.3 | 26.5 | 47.3 | 29.4 |
| Chemical Component — ZrO₂ (% by mass, with respect to total amount) | | 35.3 | 44.1 | 49.3 | 52.9 | 61.8 | 41.2 | 58.8 |
| Total Amount of CaO and ZrO₂ (% by mass, with respect to total amount) | | 88.2 | 88.2 | 88.2 | 88.2 | 88.2 | 88.2 | 88.2 |
| Mass Ratio of (CaO/ZrO₂) | | 1.50 | 1.00 | 0.79 | 0.67 | 0.43 | 1.14 | 0.50 |
| Evaluation of Alumina Adhesion — In-Molten Steel Rotation Test | | △ Tendency to wear | ○ | ○ | ○ | × Large adhesion | ○ | △ Tendency to adhere |
| Slaking Resistance of Refractory Material — Number of Days before Increase Rate of Weight reaches + 1.5% | | ○ | ○ | ○ | ○ | ○ | ○ | ○ |
| Comprehensive Evaluation | | ○ | ○ | ○ | ○ | × | ○ | ○ |

FIG. 19

Table 5 (cont.)

| | | Comparative Example 8 | Inventive Example 21 | Comparative Example 9 | Inventive Example 22 | Inventive Example 23 | Comparative Example 10 | Comparative Example 11 |
|---|---|---|---|---|---|---|---|---|
| Refractory Raw Material Composition (% by mass) | CaO-ZrO₂ particles (CaO 60%, ZrO₂ 40%) greater than 1mm to 1μm | | 40 | 35 | 31 | 31 | 30 | |
| | CaO-ZrO₂ particles (CaO 60%, ZrO₂ 40%) 0.1mm or less | | 40 | 35 | 30.5 | 30.5 | 30 | |
| | CaO-ZrO₂ particles (CaO 50%, ZrO₂ 50%) greater than 0.1mm to 1mm | | | | | | | |
| | CaO-ZrO₂ particles (CaO 50%, ZrO₂ 50%) 0.1mm or less | | | | | | | |
| | CaO-ZrO₂ particles (CaO 44%, ZrO₂ 56%) greater than 0.1mm to 1mm | | | | | | | |
| | CaO-ZrO₂ particles (CaO 44%, ZrO₂ 56%) 0.1mm or less | | | | | | | |
| | CaO-ZrO₂ particles (CaO 40%, ZrO₂ 60%) greater than 0.1mm to 1mm | 37 | | | | | | |
| | CaO-ZrO₂ particles (CaO 40%, ZrO₂ 60%) 0.1mm or less | 57 | | | | | | |
| | CaO-ZrO₂ particles (CaO 30%, ZrO₂ 70%) greater than 0.1mm to 1 mm | | | | | | | |
| | CaO-ZrO₂ particles (CaO 30%, ZrO₂ 70%) 0.1mm or less | | | | | | | |
| | Zirconia (unstabilized) 1mm or less | 16 | | | | | | |
| | zirconia (CaO 4%) 1mm or less | | 10 | | | | | |
| | CaO composition (quicklime) 1mm or less | | | 20 | | | | |
| | Dolomite (CaO 60%) 1mm or less | | | | 28.5 | 28.5 | 30 | |
| | Graphite 0.5mm or less | 10 | 10 | 10 | 10 | 10 | 10 | |
| | Phenol Resin (% by mass, with respect to and in addition to total amount) | 4 | 4 | 4 | 4 | 4 | 4 | |
| With or without of Carbonation Treatment | | With | With | With | With | Without | With | General-Purpose AG Material Al₂O₃ 69%, Carbonaceous material 31% |
| Chemical Component | Carbon (% by mass, with respect to total amount) | 11.8 | 11.8 | 11.8 | 11.8 | 11.8 | 11.8 | |
| | CaO (% by mass, with respect to total amount) | 29.0 | 47.5 | 60.8 | 52.9 | 52.9 | 52.9 | |
| | ZrO₂ (% by mass, with respect to total amount) | 59.2 | 40.8 | 27.5 | 24.1 | 24.1 | 23.5 | |
| | Total Amount of CaO and ZrO₂ (% by mass, with respect to total amount) | 88.2 | 88.2 | 88.2 | 77.1 | 77.1 | 76.5 | |
| | Mass Ratio of (CaO/ZrO₂) | 0.49 | 1.16 | 2.21 | 2.20 | 2.20 | 2.25 | |
| Evaluation of Alumina Adhesion | In-Molten Steel Rotation Test | × Large adhesion | ○ | × Large wear | △ Tendency to wear | △ Tendency to wear | × Large wear | × Large adhesion |
| Slaking Resistance of Refractory Material | Number of Days before Increase Rate of Weight reaches 1.5% | ○ | ○ | ○ | ○ | ○ | ○ | ○ |
| Comprehensive Evaluation | | × | ○ | × | ○ | ○ | × | × |

FIG. 20

Table 6

| | | Comparative Example 12 | Inventive Example 24 | Inventive Example 25 | Comparative Example 13 | Inventive Example 26 | Inventive Example 27 | Inventive Example 18 | Inventive Example 28 | Inventive Example 29 | Comparative Example 14 |
|---|---|---|---|---|---|---|---|---|---|---|---|
| Refractory Raw Material Composition (% by mass) | CaO·2ZrO₂ particles (CaO 50%, ZrO₂ 50%) [greater than 0.1mm to 1mm] | 35 | 36 | 26 | 25 | 38 | 43.2 | 45 | 48.0 | 49.5 | 50 |
| | CaO·2ZrO₂ particles (CaO 50%, ZrO₂ 50%) [0.1mm or less] | 35 | 35.4 | 26 | 25 | 38 | 43.2 | 45 | 47.0 | 49.5 | 50 |
| | Dolomite (CaO 60%) [1mm or less] | | | | 26 | | | | | | |
| | Graphite [0.5mm or less] | 30 | 28.6 | 28 | 24 | 24 | 13.6 | 10 | 5 | 1 | 0 |
| | Phenol Resin (% by mass, with respect to and in addition to total amount) | 4 | 4 | 4 | 4 | 4 | 4 | 4 | 2.1 | 2.1 | 3 |
| With or without of Carbonation Treatment | | With | With | With | With | With | With | With | With | With | With |
| Chemical Composition | Carbon (% by mass, with respect to total amount) | 31 | 30 | 26 | 25 | 25 | 15 | 12 | 4 | 2 | 1 |
| | Total Amount of CaO and ZrO₂ (% by mass, with respect to total amount) | 69 | 70 | 65 | 64 | 75 | 85 | 88 | 96 | 98 | 99 |
| | Mass Ratio of (CaO/ZrO₂) | 1.0 | 1.0 | 1.0 | 1.6 | 1.0 | 1.0 | 1.0 | 1.0 | 1.0 | 1.0 |
| Shaking Resistance of Refractory Material [Number of Days before Increase Rate of Weight reaches +1.5%] | | × | △ | △ | × | ○ | ○ | ○ | ○ | △ | ○ |
| Evaluation of Alumina Adhesion [In-Molten Steel Rotation Test] | | Large wear | Tendency to wear | Tendency to wear | Large wear | Slight tendency to wear | ○ | ○ | ○ | Tendency to wear | Large wear |
| Evaluation of Thermal Expansion [Thermal Expansion Rate at 1800°C under Non-Oxidizing Atmosphere (%)] | | 0.29 | 0.29 | 0.25 | 0.25 | 0.23 | 0.24 | 0.38 | 0.50 | 0.70 | 0.85 |
| Comprehensive Evaluation | | × | ○ | ○ | × | ○ | ○ | ○ | ○ | △ | × |

FIG. 21

Table 7

| | | Inventive Example 30 | Inventive Example 18 | Inventive Example 31 | Inventive Example 32 | Inventive Example 33 | Inventive Example 34 |
|---|---|---|---|---|---|---|---|
| Refractory Raw Material Composition (% by mass) | CaO-ZrO₂ particles (CaO>50%, ZrO₂ <50%) greater than 0.1mm to 1mm | 45 | 45 | 45 | 45 | 45 | 45 |
| | CaO-ZrO₂ particles (CaO 50%, ZrO₂ 50%) 0.1mm or less | 45 | 45 | 45 | 45 | 45 | 45 |
| | Graphite <0.5mm | 10 | 10 | 10 | 10 | 10 | 10 |
| | Phosphorus pentoxide (*) 0.1mm or less (% by mass with respect to and in addition to total amount) | | | 0.1 | 2 | 2 | 5.4 |
| | Vanadium oxide (*) 0.1mm or less (% by mass with respect to and in addition to total amount) | | | | | | |
| | Titanium oxide (*) 0.1mm or less (% by mass with respect to and in addition to total amount) | | | | | | |
| | Boron oxide (*) 0.1mm or less (% by mass with respect to and in addition to total amount) | | | | | | |
| Phenol Resin (% by mass with respect to and in addition to total amount) | | 4 | 4 | 4 | 4 | 4 | 4 |
| With or without of Carbonation Treatment | | Without | With | With | Without | With | With |
| Chemical Component | Carbon (% by mass, with respect to total amount) | 12 | 12 | 12 | 12 | 12 | 12 |
| | Total Amount of oxides (*) (% by mass, with respect to total amount) | 0.0 | 0.0 | 0.1 | 1.9 | 1.9 | 5.0 |
| | Total Amount of CaO and ZrO₂ (% by mass, with respect to total amount) | 88 | 88 | 88 | 87 | 87 | 84 |
| | Mass Ratio of (CaO/ZrO₂) | 1.0 | 1.0 | 1.0 | 1.0 | 1.0 | 1.0 |
| State of Microstructure | · Compound of oxide and CaO on surface of CaO-ZrO₂ · composition inorganic film) · State of Coating | None | Film | Film | Film | Film | Film |
| | · Thickness (μm) | 0 | 0.1~2 | 1~3 | 2~5 | 2~5 | 5~12 |
| Shaking Resistance of Refractory Material | Number of Days before Increase Rate of Weight reaches · 1.5% | 3 | 6 | 15 | 21 | >31 | >31 |
| Evaluation of Alumina Adhesion | In-Molten Steel Rotation Test | ⊘ | △ | ○ | ○ | ◎ | ◎ |
| | | ○ | ○ | ○ | ○ | ○ | Slight tendency to wear |
| Evaluation of thermal Expansion | Ratio of Thickness of Void Layer between Coarse Refractory Particle and Carbonaceous Matrix (MR Value (%)) | 0.80 | 0.50 | 0.80 | 1.00 | 3.80 | 0.80 |
| | Thermal Expansion Rate at 1000°C under Non-Oxidizing Atmosphere (%) | 0.35 | 0.35 | 0.40 | 0.36 | 0.38 | 0.35 |
| Comprehensive Evaluation | | △ | ○ | ○ | ○ | ◎ | ○ |

FIG. 22

Table 7 (cont)

| | | | Inventive Example 35 | Inventive Example 36 | Inventive Example 37 | Inventive Example 38 | Inventive Example 39 | Inventive Example 40 | Inventive Example 41 |
|---|---|---|---|---|---|---|---|---|---|
| Refractory Raw Material Composition (% by mass) | CaO-ZrO₂ particles (CaO 50%, ZrO₂ 50%) | greater than 0.1mm to 1mm | 45 | 45 | 45 | 45 | 45 | 45 | 45 |
| | CaO-ZrO₂ particles (CaO 50%, ZrO₂ 50%) | 0.1mm or less | 45 | 45 | 45 | 45 | 45 | 45 | 45 |
| | Graphite | ~0.5mm | 10 | 10 | 10 | 10 | 10 | 10 | 10 |
| | Phosphorus pentoxide(*) | 0.1mm or less (% by mass with respect to and in addition to total amount) | 6 | | | | 1 | 3 | 2 |
| | Vanadium oxide (*) | 0.1mm or less (% by mass with respect to and in addition to total amount) | | 2 | | | 1 | 1 | 2 |
| | Titanium oxide (*) | 0.1mm or less (% by mass with respect to and in addition to total amount) | | | 2 | | | 1.3 | 2 |
| | Boron oxide(*) | 0.1mm or less (% by mass with respect to and in addition to total amount) | | | | 2 | | | |
| | Phenol Resin (% by mass with respect to and in addition to total amount) | | 4 | 4 | 4 | 2.1 | 2 | 2 | 2 |
| With or without of Carbonation Treatment | | | With | With | With | With | With | With | With |
| Chemical Component | Carbon (% by mass, with respect to total amount) | | 10 | 12 | 12 | 11 | 11 | 10 | 10 |
| | Total Amount of oxides (*) (% by mass, with respect to total amount) | | 5.6 | 1.9 | 1.9 | 1.9 | 1.9 | 5.0 | 5.6 |
| | Total Amount of CaO and ZrO₂ (% by mass, with respect to total amount) | | 84 | 87 | 87 | 87 | 87 | 85 | 84 |
| | Mass Ratio of (CaO/ZrO₂) | | 1.0 | 1.0 | 1.0 | 1.0 | 1.0 | 1.0 | 1.0 |
| State of Microstructure (Compound of oxide and CaO on surface of CaO-ZrO₂ composition intorganic film) | · State of Coating | | Film | Film | Film | Film | Film | Film | Film |
| | · Thickness (μm) | | >15 | 2~5 | 0.2~2 | 2~5 | 2~5 | 5~10 | >15 |
| Slaking Resistance of Refractory Material | Number of Days before Increase Rate of Weight reaches ÷ 1.5% | | 25 | 20 | 12 | 17 | >31 | >31 | 15 |
| Evaluation of Alumina Adhesion | In-Molten Steel Rotation Test | | ○ Tendency to wear | ○ | ○ | ○ | ◎ | ◎ Slight tendency to wear | ○ Trendency to wear |
| Evaluation of thermal Expansion | Ratio of Thickness of Void Layer between Coarse Refractory Particle and Carbonaceous Matric (MS Value (%)) | | 0.10 | 1.20 | 1.00 | 1.50 | 2.00 | 0.50 | 0.20 |
| | Thermal Expansion Rate at 1000°C under Non-Oxidizing Atmosphere (%) | | 0.75 × | 0.34 ○ | 0.36 ○ | 0.29 ○ | 0.32 ○ | 0.50 ○ | 0.80 × |
| Comprehensive Evaluation | | | △ | ○ | ○ | ○ | ○ | △ | △ |

FIG. 23

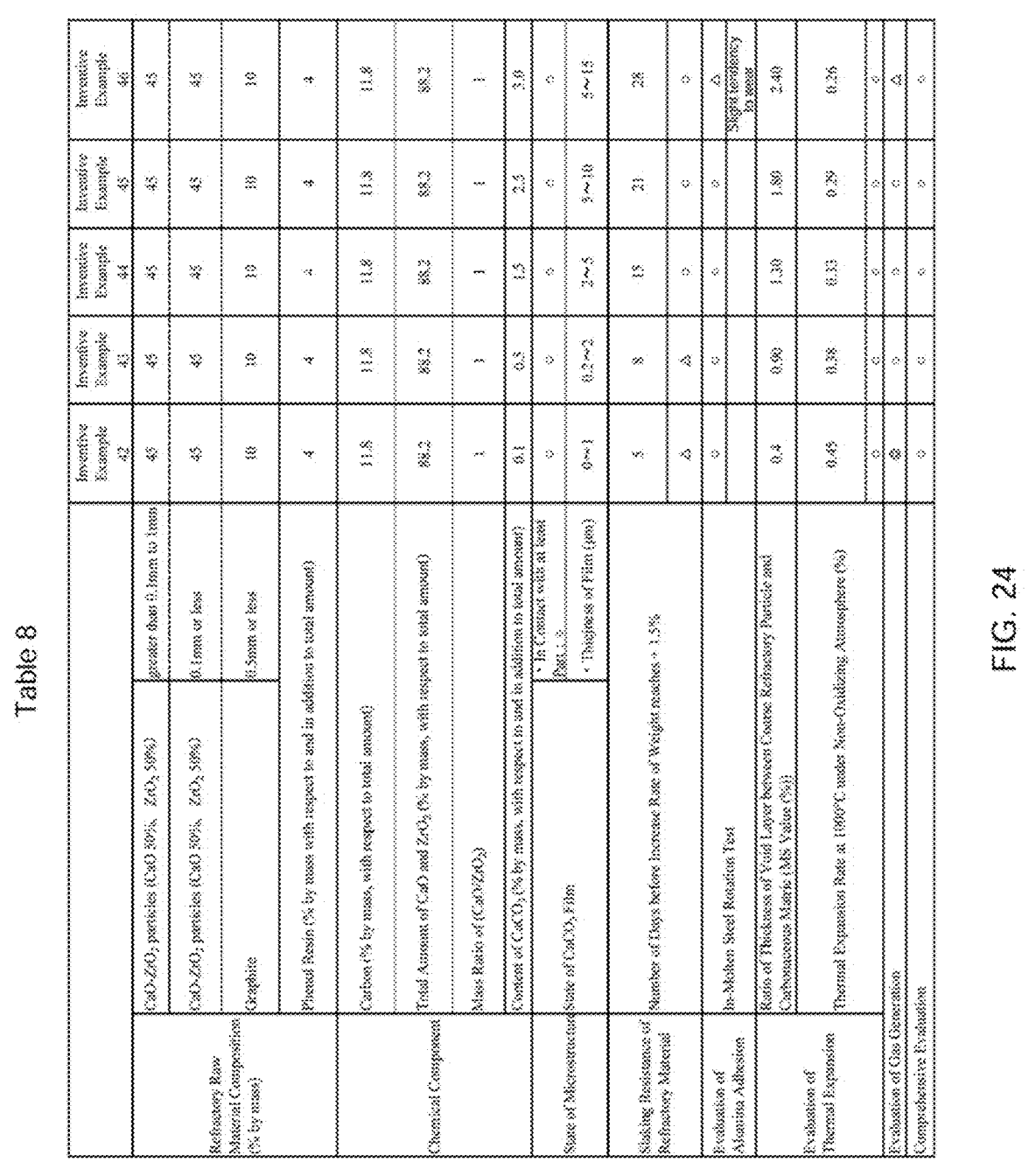

Table 8

| | | | Inventive Example 42 | Inventive Example 43 | Inventive Example 44 | Inventive Example 45 | Inventive Example 46 |
|---|---|---|---|---|---|---|---|
| Refractory Base Material Composition (% by mass) | CaO·ZrO₂ particles (CaO 50%, ZrO₂ 50%) | greater than 0.3mm to 1mm | 45 | 45 | 45 | 45 | 45 |
| | CaO·ZrO₂ particles (CaO 50%, ZrO₂ 50%) | 0.3mm or less | 48 | 48 | 48 | 48 | 48 |
| | Graphite | 0.5mm or less | 10 | 10 | 10 | 10 | 10 |
| Chemical Component | Phenol Resin (% by mass, with respect to and its addition to total amount) | | 4 | 4 | 4 | 4 | 4 |
| | Carbon (% by mass, with respect to total amount) | | 11.8 | 11.8 | 11.8 | 11.8 | 11.8 |
| | Total Amount of CaO and ZrO₂ (% by mass, with respect to total amount) | | 88.2 | 88.2 | 88.2 | 88.2 | 88.2 |
| | Mass Ratio of (CaO/ZrO₂) | | 1 | 1 | 1 | 1 | 1 |
| | Content of CaCO₃ (% by mass, with respect to sand its addition to total amount) | | 0.1 | 0.3 | 1.5 | 2.5 | 5.0 |
| State of Adherence state of CaCO₃ Film | · In Contact with at least part · | · Thickness of Film (μm) | 0~1 | 0.2~2 | 2~5 | 9~10 | 5~15 |
| Slaking Resistance of Refractory Material | Number of Days before Increase Rate of Weight reaches ~ 1.5% | | 5 | 8 | 15 | 21 | 28 |
| Evaluation of Alumina Adhesion | In-Molten Steel Rotation Test | | △ | △ | ○ | ○ | ○ Slight Inconsistency in some |
| Evaluation of Thermal Expansion | Ratio of Thickness of Void Layer between Coarse Refractory Particle and Carbonaceous Matrix (ABS Value (%)) | | 0.4 | 0.90 | 1.30 | 1.80 | 2.40 |
| | Thermal Expansion Rate at 1800°C under Non-Oxidizing Atmosphere (%) | | 0.49 | 0.38 | 0.33 | 0.29 | 0.26 |
| Evaluation of Gas Generation | | | ◎ | ○ | ○ | ○ | △ |
| Comprehensive Evaluation | | | △ | ○ | ○ | ○ | ○ |

FIG. 24

Table 9

| | | Inventive Example 46 | Inventive Example 47 | Inventive Example 48 | Inventive Example 49 | Inventive Example 50 | Inventive Example 51 | Inventive Example 52 | Inventive Example 53 | Inventive Example 54 | Inventive Example 55 | Inventive Example 56 |
|---|---|---|---|---|---|---|---|---|---|---|---|---|
| Refractory Raw Material Composition (% by mass) | CaO·2ZrO₂ particles (CaO 50%, ZrO₂ 50%); greater than 0.1mm to 1mm | 45 | 45 | 45 | 45 | 45 | 45 | 45 | 45 | 45 | 45 | 45 |
| | CaO·2ZrO₂ particles (CaO 50%, ZrO₂ 50%); 0.1mm or less | 45 | 45 | 45 | 45 | 45 | 45 | 45 | 45 | 45 | 45 | 45 |
| | Graphite; 0.5mm or less | 10 | 10 | 10 | 10 | 10 | 10 | 10 | 10 | 10 | 10 | 10 |
| | SiC; 0.1mm or less (% by mass with respect to and in addition to total amount) | 0 | 0.5 | 5 | 11.3 | 12 | | | | | 11.5 | 11.5 |
| | B₄C; 0.1mm or less (% by mass with respect to and in addition to total amount) | | | | | | 0.5 | 2.1 | 1 | 1.1 | 1.2 | 1.2 |
| | Metal Si; 0.1mm or less (% by mass with respect to and in addition to total amount) | | | | | | | | | | 1.2 | 1.2 |
| | Phenol Resin (% by mass with respect to and in addition to total amount) | 4 | 4 | 4 | 4 | 4 | 4 | 4 | 4 | 4 | 4 | 4 |
| | Carbon (% by mass, with respect to total amount) | 11.8 | 11.7 | 11.3 | 10.6 | 10.5 | 11.6 | 11.5 | 11.5 | 11.5 | 10.4 | 10.3 |
| | SiC (% by mass, with respect to total amount) | 0.0 | 0.5 | 4.7 | 10.0 | 10.5 | 0.0 | 0.0 | 0.0 | 0.0 | 9.9 | 9.9 |
| | B₄C (% by mass, with respect to total amount) | 0.0 | 0.0 | 0.0 | 0.0 | 0.0 | 1.5 | 0.0 | 1.0 | 1.0 | 1.0 | 1.2 |
| Chemical Composition | Metal Si (% by mass, with respect to total amount) | 0.0 | 0.0 | 0.0 | 0.0 | 0.0 | 0.0 | 2.0 | 1.0 | 1.0 | 1.0 | 1.2 |
| | Total Amount of CaO and ZrO₂ (% by mass, with respect to total amount) | 87.2 | 87.8 | 84.1 | 79.4 | 78.9 | 86.9 | 86.5 | 86.5 | 86.5 | 77.7 | 77.4 |
| | Mass Ratio of (CaO/ZrO₂) | 1 | 1 | 1 | 1 | 1 | 1 | 1 | 1 | 1 | 1 | 1 |
| Bending Strength | After heat treatment in non-oxidizing atmosphere at 1000°C (MPa) | 140 | 132 | 208 | 260 | 275 | 188 | 220 | 200 | 230 | 280 | 300 |
| Evaluation of Alumina Adhesion | In-Molten Steel Rotation Test | ○ | ○ | ○ | Slight Tendency to wear | ○ | ○ | Slight Tendency to wear | ○ | Slight Tendency to wear | Slight Tendency to wear | Tendency to wear |
| Comprehensive Evaluation | | ○ | ○ | ○ | ○ | ○ | ○ | ○ | ○ | ○ | ○ | △ |

FIG. 25

Table 10

| Material | | Inventive Example 57 | Comparative Example 15 | Comparative Example 16 | Comparative Example 11 | Comparative Example 17 | Comparative Example 18 | Comparative Example 19 |
|---|---|---|---|---|---|---|---|---|
| | | Present Invention | CaO-MgO-C | Conventional ZrO2-CaO-C | Al2O3-C | Al2O3-SiC-C | Spinel-C | MgO-C |
| Refractory Raw Material Composition (% by mass) | CaO (% by mass, with respect to total amount) | 45 | 45 | 17 | | | | |
| | ZrO2 (% by mass, with respect to total amount) | 45 | | 54 | | | | |
| | MgO (% by mass, with respect to total amount) | | 45 | | | | 23 | 81 |
| | Al2O3 (% by mass, with respect to total amount) | | | | 69 | 50 | 55 | |
| | SiO2 (% by mass, with respect to total amount) | | | 5 | | 25 | 3 | |
| | Carbon (% by mass, with respect to total amount) | 10 | 10 | 24 | 31 | 25 | 19 | 19 |
| Change (Increase) in In-Steel Carbon Amount  o : < 50ppm,  × : ≥ 50ppm | | o | × | × | × | × | × | × |
| Evaluation of Alumina Adhesion | In-Molten Steel Rotation Test | 6 | 110 | 173 | 100 | 133 | 149 | 58 |
| | | o | Slight tendency to wear | Slight tendency to wear | Adhesion | Adhesion | Adhesion | Adhesion |
| | | | △ | △ | × | × | × | × |
| Comprehensive Evaluation | | o | × | × | × | × | × | × |

FIG. 26

CaO—ZrO₂ COMPOSITION, METHOD FOR PRODUCING CaO—ZrO₂ COMPOSITION, AND CaO—ZrO₂-CONTAINING REFRACTORY MATERIAL AND CASTING NOZZLE

TECHNICAL FIELD

The present invention relates to: a $CaO$—$ZrO_2$ composition ($CaO$—$ZrO_2$ composite) having a special composition and structure; a production method for the $CaO$—$ZrO_2$ composition; a refractory material capable of suppressing alumina adhesion thereto occurring during continuous casting of steel, particularly, aluminum killed steel or the like, and reducing harmful inclusions; and a casting nozzle (hereinafter also referred to simply as "nozzle") using the refractory material.

BACKGROUND ART

Alumina-based inclusions in molten steel are apt to be deposited on the surface of a refractory material through physical contact of the refractory material with the molten steel and/or chemical interaction therebetween, wherein the resulting deposited substance will grow and become large inclusions, and the large inclusions will be incorporated into slabs together with molten steel, causing defects in slab and deterioration in slab quality. Moreover, if alumina-based inclusions in molten steel are deposited on, e.g., an inner bore of a casting nozzle such as an immersion nozzle or a discharge port of the casting nozzle having a great influence on a molten steel flow in a casting mold, and thereby an initial shape of the inner bore or the discharge port gradually changes, it is likely that the molten steel becomes failing to uniformly flow in the casting mold, and, due to the so-called "biased flow", mold powder, gas bubbles and others are entrained into slabs, causing deterioration in slab quality.

In recent years, the need for higher quality of steel and higher durability of a casting nozzle has been increasing more and more. From a viewpoint of this situation, various measures for material have been attempted to prevent alumina adhesion to a refractory material of the casting nozzle and minimize the wear amount of the refractory material and the adhesion thereto, in addition to improvements in nozzle structure.

In order to improve the ability to form a compound having a melting point equal to or less than a molten steel temperature, there is a technique of incorporating CaO in the refractory material of the nozzle. When CaO is incorporated in a nozzle material, alumina precipitated from molten steel reacts with CaO in the nozzle material to form a reaction product having a melting point significantly lower than that of alumina. Since this reaction product is a low-melting-point substance, it has a low viscosity, and is easily eluted by the molten steel flow to suppress the adhesion to an inner wall of the nozzle. This reduces a situation where alumina grows on the inner wall, causing clogging of the nozzle.

In order to improve the resistance to the adhesion (adhesion resistance), various techniques for increasing the amount of CaO in a refractory material to provide a composition consisting mainly of CaO component or a CaO—MgO component have been attempted. A core component of such techniques is to allow CaO which reacts with alumina inclusions to be present at the highest possible content to give high self-fluxing (self-melting) ability to a contact surface of the refractory material with molten steel, thereby suppressing the adhesion to the inner bore surface of the nozzle, and further causing alumina to flow down and float as a low-melting-point compound so as to remove the alumina.

As a CaO-based refractory material, a refractory material containing a dolomite composition as a CaO source is disclosed in e.g., the below-mentioned Patent Document 1.

Such a CaO-based refractory material contains free CaO, i.e., CaO in a form that is not a compound or a solid solution, in a large amount.

When coming into contact with water in the air or directly with water, free CaO easily forms calcium hydroxide (Ca(OH)₂) (undergoes a so-called slaking (hydration) phenomenon). When CaO-containing particles are slaked (hydrated), volume expansion during the hydration of Ca(OH)₂ causes not only transgranular fracture but also fracture of the microstructure of the refractory material, leading to difficulty in maintaining the shape of the refractory material as a structural body, in many cases. Such a technique of simply increasing the amount of free CaO causes a serious problem not only in production, but also during storage, transportation and use (when used for casting of steel).

Since CaO (lime) has a large thermal expansion, a refractory material containing a large amount of CaO is more likely to undergo fracture or the like, due to thermal shock or static stress caused by the large thermal expansion, in addition to slaking.

In order to solve the problems with slaking of such free CaO, the present inventors invented a refractory material in which the surface of CaO is coated with carbonate or the like, as shown in, e.g., the below-mentioned Patent Document 2.

Although the technique described in the Patent Document 2 can provide a significant improvement against fracture, etc., due to slaking and thermal expansion, a problem with corrosion-erosion resistance and strength can still occur, depending on casting conditions such as casting time period and steel grade, On the other hand, for purposes such as solving the problems with slaking and thermal expansion caused by CaO in the refractory material containing a CaO component in a large amount, and improving corrosion-erosion resistance and strength, a refractory material which contains a CaO component but does not contain any free CaO has been proposed. For example, the below-mentioned Patent Document 3 discloses a carbonless (C-less) refractory material comprising: 5 to 40% by mass of CaO; 2 to 30% by mass or SiO₂; 35 to 80% by mass of ZrO₂; and less than 5% by mass (including zero) of carbon.

However, the refractory material disclosed in the Patent Document 3 is based on the assumption of suppressing slaking. Thus, for example, if it is attempted to maximize a CaO content in a $CaO$—$ZrO_2$ based refractory material, there is no other choice but to form the refractory material as a CaO.ZrO₂ compound containing no free CaO, wherein the CaO content has to be limited to about 31% by mass or less. This CaO content limited to about 31% by mass or less is not sufficient to react with alumina-based in-steel inclusions or cause flow-down thereof, still resulting in the occurrence of alumina adhesion or clogging of the inner bore of the nozzle, in many cases.

Further, although a ZrO₂-containing slag phase as a low-melting-point phase is formed through a contact reaction with alumina as an in-steel inclusion on a working surface of the refractory material, it has an increased viscosity, and depending on the flow rate of molten steel, inclusions such as alumina is likely to adhere to the surface of the refractory material without flowing down. This gives rise to a problem that it becomes impossible to ensure stable adhesion-resistance due to the influence of steel grade and casting conditions.

Further, since the $SiO_2$ component is contained in the entire refractory material, there is a problem that it promotes not only self-fluxing on the contact surface with molten steel, but also softening or self-fluxing in the entire refractory structure, leading to excessive deterioration in corrosion-erosion resistance and strength.

CITATION LIST

Patent Document

Patent Document 1: JP-A 2010-167481
Patent Document 2: WO 2013/081113
Patent Document 3: JP-A 2003-040672

SUMMARY OF INVENTION

Technical Problem

A technical problem to be solved by the present invention is to provide a $ZrO_2$—CaO—C based refractory material containing free CaO, which is capable of maintaining high adhesion resistance over a long period of time, while exhibiting significant slaking resistance, and suppressing self-fluxing, i.e., exhibiting corrosion-erosion resistance.

The technical problem is also to provide a $ZrO_2$—CaO composition as a raw material of a refractory material for giving the above properties to the refractory material, a production method for the $ZrO_2$—CaO composition, and a casting nozzle comprising the refractory material.

Solution to Technical Problem

The refractory material of the present invention is based on a function of suppressing adhesion or deposition of molten steel-derived oxides, etc. (so-called inclusions), consisting mainly of alumina which is a deoxidization product of molten steel, onto the surface of the refractory material during casting.

In a conventional CaO-containing or CaO-based refractory material, there is a problem that the amount of CaO supplied from the inside of the refractory material to an interface with molten steel becomes insufficient, resulting in the occurrence of alumina adhesion, or a CaO—$Al_2O_3$ based melt generated at the interface during casting has a lowered viscosity under the influence of silica, etc., in the refractory material, resulting in increase in the self-fluxing property. In the present invention, in order to compensate for this disadvantage, a $ZrO_2$ component is incorporated in a CaO—$Al_2O_3$ based composition. In this regard, the present inventors have found that the incorporation of the $ZrO_2$ component makes it possible to improve stability of films existing in the CaO—$Al_2O_3$ based composition, and obtain an effect of suppressing the above damage.

Further, in the present invention, one feature is to increase the content of a CaO component to 40% by mass or more which is greater than that (31% by mass) of CaO in CaO·$ZrO_2$ which is a non-slakable compound, as a means to improve adhesion resistance of a $ZrO_2$—CaO—C based refractory material.

However, the present inventors have found that, properties, particularly slaking resistance, of a refractory material cannot be improved by a technique of using, as a raw material, a $ZrO_2$—CaO based composition which is allowed to include free CaO by a commonly-used/conventional production method, e.g., by simply incorporating a large amount of CaO-based composition (such as lime clinker), or simply increasing the percent of a CaO component, in a $ZrO_2$—CaO—C based refractory material containing no free CaO.

On the other hand, as mentioned above, the present inventors developed the technique disclosed in the Patent Document 2, and successfully gave significant slaking resistance and significantly low thermal expansion to a Ca—C based or CaO—MgO—C based refractory material with a high CaO content, and a nozzles using this refractory material.

The inventors attempted to apply this technique to a $ZrO_2$—CaO—C based refractory material obtained by simply increasing the content of a CaO component based on addition of CaO clinker, etc. As a result, the inventors also found that slaking resistance of the refractory material cannot be improved even by simply applying the technique of the Patent Document 2.

Therefore, the inventors decided to improve slaking resistance, etc., of the $ZrO_2$—CaO based composition containing free CaO, i.e., of a raw material particle itself.

That is, a basic feature of the present invention is to miniaturize free CaO in a $ZrO_2$—CaO based raw material particle which contains, as a mineral phase, CaO in an amount greater than the amount of solid solution with respect to $ZrO_2$ (free CaO), to reduce the area of a single zone in which a free CaO part exposed to the surface of the $ZrO_2$—CaO based raw material particle, i.e., the free CaO part in the $ZrO_2$—CaO based raw material particle is in contact with the outside.

This makes it possible to prevent hydration of the $ZrO_2$—CaO based raw material particle containing free CaO, thereby improving the slaking resistance.

The $ZrO_2$—CaO based raw material particle having this basic feature may be further formed with a carbonate or inorganic film, etc., to obtain an unprecedented structure which protects the entire surface of the $ZrO_2$—CaO based raw material particle in a seamless manner, which is unique to the $ZrO_2$—CaO based raw material particle having the features of the present invention.

The $ZrO_2$—CaO based raw material particle having these basic features can be applied to a $ZrO_2$—CaO—C based refractory, nozzle, etc., thereby improving slaking resistance, thermal shock resistance, resistance to breaking due to thermal expansion difference, etc.

Specifically, the present invention provides: a CaO—$ZrO_2$ composition described in the following sections 1 to 3; a production method for the CaO—$ZrO_2$ composition, described in the following sections 4 and 5; a CaO—$ZrO_2$-containing refractory material described in the following sections 6 to 11; and a casting nozzle described in the following sections 12 to 14.

1. A CaO—$ZrO_2$ composition containing a CaO component in an amount of 40% by mass to 60% by mass, wherein a mass ratio of the CaO component to a $ZrO_2$ component is 0.67 to 1.5, and wherein the CaO—$ZrO_2$ composition includes a eutectic microstructure of CaO crystals and Ca$ZrO_3$ crystals, wherein a width of each of the CaO crystals observable in a cross-sectional microstructure is 50 μm or less.

2. The CaO—$ZrO_2$ composition as described in the section 1, wherein the width of each of the CaO crystals is 20 μm or less.

3. The CaO—$ZrO_2$ composition as described in the section 1 or 2, wherein a CaCO$_3$ film having a thickness of 0.1 µm to 5 µm is formed on a surface of the CaO—ZrO$_2$ composition, such that it continuously lies over surfaces of the CaO crystals and the CaZrO$_3$ crystals.

4. A method of producing the CaO—ZrO$_2$ composition as described in any one of the sections 1 to 3, comprising the steps of: heating a CaO raw material and a ZrO$_2$ raw material to a molten state at a temperature equal to or greater than that of a liquidus line for a composition of a CaO component and a ZrO$_2$ component; and cooling the CaO raw material and the ZrO$_2$ raw material from the molten state to a temperature of a solidus line for the composition at a cooling rate of 10° C./sec or more.

5. The method as described in the section 4, wherein: the CaO raw material is one or more selected from the group consisting of quicklime, and CaO compounds each of which becomes CaO, except for unavoidable impurities, at a temperature during melting, and, wherein the CaO raw material has a size of 10 mm or less; and the ZrO$_2$ raw material is one or more selected from the group consisting of: CaO-stabilized ZrO$_2$, CaO-partially stabilized ZrO$_2$, and unstabilized ZrO$_2$, wherein the ZrO$_2$ raw material has a size of 10 mm or less.

6. A CaO—ZrO$_2$-containing refractory material comprising the CaO—ZrO$_2$ composition as described in any one of the sections 1 to 3, wherein a mass ratio of the CaO component to the ZrO$_2$ component is 0.5 to 2.2, and wherein the refractory material contains the CaO component and the ZrO$_2$ component in a total amount of 65% by mass to 98% by mass, and a free carbon component in an amount of 2% by mass to 30% by mass, where an amount of the refractory material excluding any unavoidable production-related components is 100% by mass.

7. The CaO—ZrO$_2$-containing refractory material as described in the section 6, wherein the mass ratio of the CaO component to the ZrO$_2$ component is 0.67 to 1.5.

8. The CaO—ZrO$_2$-containing refractory material as described in the section 6 or 7, wherein the content of the free carbon component is 4% by mass to 15% by mass, and wherein the refractory material has a thermal expansion rate of 0.5% or less as measured in a non-oxidizing atmosphere at 1000° C.

9. The CaO—ZrO$_2$-containing refractory material as described in any one of the sections 6 to 8, which contains one or more components selected from the group consisting of B$_2$O$_3$, TiO$_2$, P$_2$O$_5$, and V$_2$O$_5$ in a total amount of 0.1% by mass to 5.0% by mass, wherein an inorganic film comprised of a compound of CaO and one or more components selected from the group consisting of B$_2$O$_3$, TiO$_2$, P$_2$O$_5$, and V$_2$O$_5$ is formed on surfaces of at least the CaO crystals of the CaO—ZrO$_2$ composition, wherein the inorganic film has a thickness of 0.1 µm to 15 µm.

10. The CaO—ZrO$_2$-containing refractory material as described in any one of the sections 6 to 9, wherein CaCO$_3$ lies in contact with at least a part of the inorganic film, and wherein a content of CaCO$_3$ is 0.1% by mass to about 2.5% by mass.

11. The CaO—ZrO$_2$-containing refractory material as described in any one of the sections 6 to 10, which further contains one or more selected from the group consisting of SiC, metal Si, and B$_4$C, wherein when SiC is selected, the content thereof is 10% by mass or less, and when Si and/or B$_4$C are selected, the content of either one or both thereof is 2% by mass or less.

12. A casting nozzle formed of a single layer which is composed of the CaO—ZrO$_2$-containing refractory material as described in any one of the sections 6 to 11 and disposed in a part or an entirety of a region to be subjected to contact with molten steel to have a molten steel contact surface and a back surface opposed thereto.

13. A casting nozzle formed of a plurality of layers which include: a first refractory layer composed of the CaO—ZrO$_2$-containing refractory material as described in any one of the sections 6 to 11 and disposed in a part or an entirety of a molten steel contact surface; and a second refractory layer composed of a refractory material having a composition different from that of the first refractory layer and disposed on a back side of the first refractory layer.

14. The casting nozzle as described in the section 12 or 13, which comprises a layer composed of a gas-injecting refractory member and provided in a part of an inner bore portion.

A chemical composition of various components containing in each of the CaO—ZrO$_2$ composition and the CaO—ZrO$_2$-containing refractory material of the present invention was measured by a method according to JIS 82216, using a sample "subjected to heating in a non-oxidizing atmosphere at 1000° C. The reason is to remove components, such as water, organic matter, hydrates, and carbonate compositions, in the refractory material, and stabilize the chemical composition of the refractory material by carbonization of an organic binder component, thereby improving analytical accuracy. From this point of view, a heating period of time is set to a period to be continued until there is no change in weight due to the heating (this also applies to the following description).

As used in the present invention, the term "free carbon" means a carbon composed of a simple carbon component excluding unavoidable impurities, other than compounds, e.g., carbides such as as B$_4$C and SiC, and means any carbon existing in a refractory microstructure, produced by subjecting any of various types of organic binders, pitch, tar, or carbon black to heating in a non-oxidizing atmosphere at 1000° C., wherein the carbon may be amorphous or may be crystalline such as graphite, or may have any shape and structure, e.g., may exist in a refractory microstructure in granular form (including fibrous form) or in continuous or discontinuous form without having a specific shape. This "free carbon" will hereinafter be referred to simply as "carbon".

The width of each of the CaO crystals in the CaO—ZrO$_2$ composition of the present invention means a shorter length of each of the CaO crystals of a particle which is the CaO—ZrO$_2$ composition after being subjected to given granulating, in the observation visual field during microscopic observation of the cross-section (cut surface) of the particle.

That is, since it is often the case that the CaO crystal continuously exists in the form of an elongate thin layer extending to segment a CaO—ZrO$_2$ crystalline microstructure (see FIG. 4), the "width" means a shorter length of this elongate shape. It should be noted that even when the CaO crystal continuously exists in the form of an elongate thin layer, the CaO crystal can appear as a particle shape, a rod shape, an elliptical shape or a round shape (see FIG. 4). In this case, the "width" also means a shorter length of the CaO crystal.

The CaO—ZrO$_2$ composition of the present invention contains a CaO component in an amount of 40% by mass to 60% by mass, wherein there is free CaO, and includes a eutectic microstructure CaO crystals and CaZrO₃ crystals. The content of the CaO component can be expressed as a mass ratio of the CaO component to a ZrO₂ component, which is 0.67 to 1.5.

With regard to the width of each of the CaO crystals in such a composition, in a conventional commonly-used composition in which there is free CaO (which contains CaO in an amount of greater than about 31% by mass), as the content of CaO becomes larger, CaO crystals concentrate, and the resulting continuous crystal phase in that position becomes larger in size.

Due to the presence of such a large-sized CaO crystal phase, slaking resistance of such a composition or a refractory material using such a composition significantly deteriorates.

The first reason is that such a large-sized crystalline microstructure is exposed to the outside of the composition (raw material particle) over a wide area, and thus becomes more likely to react with water or the like, and the second reason is that, although a carbonate CaCO₃ film can be formed on the surfaces of the CaO crystals to improve slaking resistance, even if a film of carbonate or the like is formed on the surfaces of the CaO crystals exposed over a wide area, it is difficult to maintain continuity with respect to the CaZrO₃ crystals around the CaO crystals, and such a film is liable to easily drop off.

The inventors have found that, by setting the width of each of the CaO crystals in the CaO—ZrO₂ composition to about 50 μm or less, it becomes possible to significantly suppress hydration of the CaO crystals without providing the after-mentioned inorganic or carbonate film on the surface of a particle-shaped CaO—ZrO₂ composition, and, by setting the width of each of the CaO crystals to about 50 μm or less in a case where the after-mentioned inorganic or carbonate CaCO₃ film is formed on the surfaces of the CaO crystals to improve slaking resistance and thermal shock resistance, it becomes possible to allow the inorganic or CaCO₃ film to continuously exist on the surfaces of the CaO crystal and CaZrO₃ crystal, together with the conventional problem.

Although the details of the mechanism are unclear, it is considered that, since the width of each of the CaO crystals exposed to the outer surface of the particle-shaped CaO—ZrO₂ composition is relatively small, a distance between the CaZrO₃ crystals lying among the CaO crystals on the surface of the particle also becomes smaller, whereby an inorganic or carbonate film around each of a plurality of CaO crystal boundaries becomes more likely to cross-link with an inorganic or carbonate film around an adjacent one of the CaO crystal boundaries. It is also considered that the cross-linked inorganic or carbonate film is joined to the CaO crystal phase through a large number of spike-like structures, thereby improving stability of the film.

In the CaO—ZrO₂ composition of the present invention, the content of the CaO component is set to 40% by mass to 60% by mass. A preferred range is a range of a eutectic composition in which CaO easily crystallizes as a fine microstructure, wherein the content of CaO is close to about 50%.

In order to obtain a significant adhesion resistance effect as a refractory material (in comparison to a CaO—ZrO₂ composition containing no free CaO), the content of the CaO component should be set to 40% by mass or more. Even in the CaO—ZrO₂ composition of the present invention, if the content of the CaO component is greater than 60% by mass, the CaO crystals becomes likely to concentrate, and the resulting continuous crystal phase in that position tends to become larger in size, leading to a tendency toward deterioration in slaking resistance of the composition. Further, the composition has a higher melting point, leading to deterioration in meltability during electromelting, and a problem in production. Therefore, the content of the CaO component should be set to 60% by mass or less.

In order to further improve the effect of suppressing a hydration reaction of the CaO crystals, and stability of the inorganic or carbonate film provided on the surfaces of the CaO crystals, the width of each of the CaO crystals is preferably set to about 20 μm or less.

In the case where the carbonate CaCO₃ film is formed on the surfaces of the CaO crystals, the thickness of the carbonate CaCO₃ film is set in the range of 1 μm to 5 μm. This is because if the thickness is less than 1 μm, or greater than 5 μm, an absent part of the CaCO₃ film is highly likely to occur during conveyance or other handlings of the CaO—ZrO₂ composition or when the CaO—ZrO₂ composition is used as a raw material of a refractory material and subjected to kneading or the like together with other raw materials of the refractory material.

In the refractory material of the present invention containing the aforementioned CaO—ZrO₂ composition, it is most preferable to use, as a primary raw material, only the aforementioned CaO—ZrO₂ composition, i.e., that a CaO component and a ZrO₂ component of the refractory material entirely derived from the CaO—ZrO₂ composition of the present invention. In this case, the mass ratio of the CaO component to the ZrO₂ component is 0.67 to 1.5, as with the CaO—ZrO₂ composition of the present invention.

Further, in this case, the refractory material contains the CaO component and the ZrO₂ component in a total amount of 65% by mass to 98% by mass, and a free carbon component in an amount of 2% by mass to 30% by mass, where the amount of the refractory material excluding any unavoidable production-related components is 100% by mass.

While using, as a primary raw material, only the aforementioned CaO—ZrO₂ composition, the refractory material of the present invention containing the aforementioned CaO—ZrO₂ composition may further contain, e.g., an additional CaO component-containing composition such as lime clinker or dolomite, or an additional zirconia component-containing composition such as unstabilized zirconia, partially stabilized zirconia, stabilized zirconia, or zirconia.

In a case where the refractory material further contains the additional CaO component-containing composition or the additional zirconia component-containing composition, the mass ratio of the CaO component to the ZrO₂ component is 0.5 to 2.2, and the total amount of the CaO component and the ZrO₂ component is 65% by mass to 98% by mass, where the amount of the refractory material excluding any unavoidable production-related components is 100% by mass.

This is because, when containing the additional CaO component, the additional CaO component is highly likely to be slaked, so that the amount of the additional CaO component should be less than an amount causing breaking of the refractory macrostructure due to slaking thereof. Specifically, if the mass ratio of the CaO component to the ZrO₂ component is greater than 2.2, the CaO component becomes highly likely to be slaked.

On the other hand, when containing the additional ZrO₂ component, adhesion resistance is highly likely to deteriorate due to the additional ZrO₂ component, so that the amount of the additional ZrO₂ component should be less than an amount causing deterioration in adhesion resistance.

Specifically, if the mass ratio of the CaO component to the $ZrO_2$ component in the refractory material is less than 0.5, and the total amount of the CaO and $ZrO_2$ components is less than 65% by mass, it becomes difficult to obtain a sufficient adhesion resistance-improving effect.

The rage of each of the mass ratio of the CaO component to the $ZrO_2$ component and the total amount of the CaO and $ZrO_2$ components may be determined according to required properties such as the degree of adhesion resistance and strength corresponding to individual casting conditions.

In order to maintain high slaking resistance or suppress excessive self-fluxing, it is preferable that the CaO component in the refractory material is entirely derived from the $CaO$—$ZrO_2$ composition of the present invention and do not comprise any raw material containing free CaO derived from, e.g., quicklime or dolomite ($CaO$—$MgO$ clinker). In this preferred case, the upper limit of the mass ratio of the CaO component to the $ZrO_2$ component in the refractory material is 1.5.

There is no particular need to set the upper limit of the total amount of the CaO and $ZrO_2$ components from a viewpoint of adhesion resistance. However, if the total amount of CaO and $ZrO_2$ is greater than 98% by mass, a carbon component as a binder in the refractory material becomes excessively small, so that strength as the refractory material becomes insufficient, and deterioration in thermal shock resistance becomes prominent.

Therefore, the content of the free carbon component in the refractory material is set to 2% by mas or more. Here, carbon as a binder may be further increased, or a carbon component such as graphite may be added to improve thermal shock resistance, etc.

If the content of the free carbon component is greater than 30% by mass, deterioration in corrosion-erosion resistance and abrasion resistance, and deterioration in steel quality due to elution of the carbon component into steel, generation of inclusions, etc., are likely to occur. Therefore, the content is set to 30% by mass or less. In order to further suppress the deterioration in corrosion-erosion resistance and wear resistance, and further suppress the elution of the carbon component into steel, the content of the free carbon component is preferably set to 15% by mass or less.

Further, the refractory material of the present invention (1) may contain one or more components selected from the group consisting of $B_2O_3$, $TiO_2$, $P_2O_5$, and $V_2O_5$ in a total amount of 0.1% by mass to 5.0% by mass, (2) wherein an inorganic film comprised of a compound of CaO and one or more components selected from the group consisting of $B_2O_3$, $TiO_2$, $P_2O_5$, and $V_2O_5$ is formed on surfaces of at least the CaO crystals of the $CaO$—$ZrO_2$ composition, wherein the inorganic film has a thickness of 0.1 μm to 15 μm.

The above-mentioned inorganic film mainly has a function of protecting the exposed surface of the CaO component of the $CaO$—$ZrO_2$ composition from hydration, thereby making it possible to further significantly improve the slaking resistance.

Further, during the formation of the inorganic film, a void layer (hereinafter also referred to as "microspace") is created mainly by shrinkage of the inorganic film formed on the exposed surface of the $CaO$—$ZrO_2$ composition. This void layer functions as a layer for buffering thermal expansion of the $CaO$—$ZrO_2$ composition and other raw material particles.

In conventional techniques, particularly in a case where the content of the free carbon component is as small as 15% by mass or less, thermal shock resistance generally tends to deteriorate. By contrast, in the refractory material of the present invention having the above-mentioned inorganic film, the thermal expansion rate in a non-oxidizing atmosphere at 1000° C. can be reduced to 0.5% or less which is about ½ as compared with a conventional refractory material having a similar chemical composition.

Specifically, a void layer having a thickness equal to the amount of thermal expansion of each high-expansion particle in the microstructure of a refractory material occurring when the refractory material undergoes temperature changes during preheating or casting or cooling can be preliminarily formed around the particle in conjunction with the formation of the inorganic film, whereby thermal expansion of the particle up to a predetermined temperature can be absorbed by the void layer around the particle inside the refractory material to reduce an thermal expansion amount of the refractory material. This makes it possible to significantly improve thermal shock resistance.

In order to form the void layer at the surface of a particle composed of the $CaO$—$ZrO_2$ composition ($CaO$—$ZrO_2$ composition particle), a hydrate, chloride or carbonate layer having a given thickness is formed by a technique of allowing water or water-containing gas to come into contact with the particle for a given period of time, or a technique of allowing an acid/alkali solution or gas to come into contact with the particle, in a raw material stage or in a heat treatment step of a production process of the refractory material.

In other words, the above-mentioned inorganic film can be formed irrespective of whether or not there is a carbonate film on the surface of the particle of the $CaO$—$ZrO_2$ composition as a raw material.

Next, the mechanism, etc., of the formation of the inorganic film will be described in detail.

Since the inside of a carbon-containing refractory material is low in oxygen partial pressure, an oxide having a high vapor pressure is more likely to fill the microstructure of the refractory material in the form of a gas component, and the gas component selectively undergoes reaction at the surface of each CaO component-containing particle in the microstructure to produce a relatively uniform film-shaped inorganic compound. Otherwise, the oxide comes into direct contact with the CaO component in a liquid or solid state to produce a similar inorganic compound. Melting points of oxides $B_2O_3$, $TiO_2$, $P_2O_5$ and $V_2O_5$ to be used in the present invention are about 480° C., 1840° C., 340° C., and 690° C., respectively. Among them, $B_2O_3$ and $V_2O_5$ are particularly low in melting point and thereby high in vapor pressure. Therefore, in the present invention, $B_2O_3$ and $V_2O_5$ are particularly preferred oxides for use in forming an inorganic compound layer on each CaO surface.

On the other hand, $TiO_2$ has a melting point which is not low as compared with $B_2O_3$ and $V_2O_5$, and thereby has a relatively low vapor pressure. Thus, although a contact reaction with CaO in the form of a gas or liquid phase cannot be expected, a technique of allowing $TiO_2$ to come into direct contact with surface of each CaO component-containing particle can be used to form a hydration-resistant inorganic compound layer. Further, $B_2O_3$ and $V_2O_5$ have a function of increasing the rate of reaction with $TiO_2$. Thus, the use of $TiO_2$ in combination with $B_2O_3$ and/or $V_2O_5$ makes it possible to facilitate formation of a desired inorganic compound layer having high coatability.

These oxides may be used independently or in the form of a combination of two or more of them. Then, the selected one or more oxides are incorporated into the refractory material in a total amount of 0.1% by mass to 5.0% by mass, so as to form a desired inorganic compound layer (film) in each CaO surface. If the content of the one or more oxides is less than 0.1% by mass, no film can be formed. If the content is greater than 5% by mass, a resulting film has an excessively large thickness, so that film defects are more likely to occur.

The inorganic compound layer (film) produced by a reaction between the one or more oxides and the CaO component is thermodynamically stable, and free of inducing a hydration reaction. Thus, even if the inorganic compound layer contacts water, no change occurs in itself. In order to prevent a hydration reaction of an active CaO component existing inside the film made of the inorganic compound, it is critical to meet the following requirements: (a) a produced inorganic compound is stable with respect to water; (b) the surface of each CaO component-containing particles is uniformly coated with the stable inorganic compound; and (c) the film made of the inorganic compound is a non-porous film and a defect-free film without any crack and peeling.

With regard to the requirement (a), the inorganic compound to be produced in the present invention is stable because it is not thermodynamically hydrated, as mentioned above.

As is well known, CaO easily undergoes a hydration reaction according to the following reaction formula:

$$CaO + H_2O = Ca(OH)_2$$

In this reaction, standard free energy of formation $\Delta G°$ is $-57.8$ KJ/mol (T=298 K).

As mentioned above, in order to prevent the hydration of CaO, the following two techniques have been mainly pursued: one technique of lowering the activity of CaO in each CaO component-containing particle to inactivate CaO, and another technique of forming a dense, stable, and water component-impermeable film on the surface of each CaO component-containing particle, at least in a final product stage. The former technique has been realized by forming a compound of CaO with an oxide such as $TiO_2$. However, in order to inactivate CaO, it is necessary to excessively add the oxide to form a compound. As a result, the activity of CaO, which contributes to the reactivity of CaO itself, significantly deteriorates, and the reactivity with in-steel alumina inclusions significantly deteriorates, which gives rise to a problem in terms of clogging prevention effect. Further, the compound-forming technique is more likely to lead to a lower melting point. Further, a function of preventing hydration of the CaO component-containing particle is hardly said to be sufficient. On the other hand, in the latter technique, since the film is an extremely-thin (0.05 to 4 μm-thick) carbonated film or an oil-based film, a part or the entirety of the film is broken or lost during a production process of a refractory material, particularly during kneading, heat treatment and processing process of raw materials of the refractory material, which makes it difficult to bring out sufficient slaking resistance.

In the present invention, an example of the inorganic film (compound) to be formed on each CaO surface is as follows:

$3CaO \cdot B_2O_3(+32.0 \text{ kJ/mol}), 2CaO \cdot B_2O_3(+44.1$
$\text{kJ/mol}), CaO \ B_2O_3(+82.4 \text{ kJ/mol})$ $3CaO_2 \cdot TiO_2(+12.4 \text{ kJ/mol}), 4CaO_3 \cdot TiO_2(+16.8$
$\text{kJ/mol}), CaO \cdot TiO_2(+24.4 \text{ kJ/mol})$ $3CaO \cdot V_2O_5 \ (+52.9 \text{ kJ/mol}), 2CaO \cdot V_2O_5(+74.6$
$\text{kJ/mol}), CaO \cdot V_2O_5(+88.2 \text{ kJ/mol})$ $3CaO \cdot P_2O_5(+236 \text{ kJ/mol}), 2CaO \cdot P_2O_5(+280.7 \text{ kJ/mol})$ In parentheses, a change in free energy ($\Delta G$, at 298 K) during a hydration reaction for each compound is indicated. In each compound, $\Delta G$ has a plus value, which shows that no hydration reaction occurs.

The inorganic film produced by a reaction between CaO and any of the above oxides is thermodynamically stable, and free of inducing a hydration reaction, as mentioned above. Thus, even if the inorganic film contacts water, it remains unchanged and stable. In order to prevent a hydration reaction of active CaO existing inside the inorganic film, it is critical to meet the following requirements: (a) a produced inorganic film is stable with respect to water; (b) the surface of each CaO-containing particle is coated with the stable inorganic film; and (c) the inorganic film is a non-porous film and a defect-free film without any crack and peeling.

With regard to the requirement (b), the surfaces of at least CaO crystals in each CaO component-containing particle can be uniformly coated by the aforementioned method.

With regard to the film defects in the requirement (c), the thickness of the produced film is important.

The film thickness has been studied using various inorganic compounds produced in the present invention. As a result, it has been found that a film thickness required for providing a good film excellent in slaking resistance and free of crack and peeling is 0.1 μm to 15 μm, preferably in a range of 0.5 μm to 5 μm. If the film thickness is less than 0.1 μm, it becomes difficult to produce a continuous coating layer so that continuity of coating is lost, causing deterioration in slaking resistance. On the other hand, if the film thickness is greater than 15 μm, crack or peeling is more likely to occur in a resulting film due to a difference in thermal expansion rate between the particle and the film, and the thickness of a void layer decreases, resulting in a possibility that slaking resistance deteriorates, and thermal expansion becomes larger.

With regard to formation of a defect-free film in the requirement (c), slaking resistance is largely improved by setting the film thickness to fall within the range of 0.1 to 15 μm, as mentioned above.

However, under more severe conditions, e.g., in a situation where the film is left in a hot and humid atmosphere for a prolonged period of time, a hydration reaction is likely to gradually progress due to micro-defects existing in the film. In such a situation, slaking resistance can be improved by allowing the CaO—$ZrO_2$ composition to further react with a carbon dioxide gas to form a $CaCO_3$ film on the surface of the particle (hereinafter referred to as "carbonation treatment"). In this case, the heat treatment needs to be performed at a temperature equal to or less than a value causing decomposition of calcium carbonate ($CaCO_3$). It is considered that the improvement in slaking resistance is achieved because a part of $CO_2$ intruding via defects of the inorganic film produces calcium carbonate on the surface of each CaO-containing particle to prevent slaking, and a part of CaO constituting the film reacts with $CO_2$ to produce calcium carbonate, primarily, in openings of the film, so that the film defects are reduced or eliminated.

As a result, the percent by mass of such a CaO film existing in the refractory material needs to be about 0.1% by mass to about 2.5% by mass.

If the amount of $CaCO_3$ is less than 0.1% by mass, the intended effect becomes difficult to appear. On the other hand, if the amount is greater than 2.5% by mass, $CO_2$ is generated during preheating or casting, depending on preheating conditions before casting, which is likely to undesirably cause problems in casting operation, such as a boiling phenomenon in which the level of molten steel in a mold largely changes, and splashing at the initial stage of pouring.

From a viewpoint of reducing the thermal expansion amount, it is preferable that the thickness of the void layer around each refractory raw material particle is set as large as possible, and the void layer is formed around the surface of any refractory raw material particle whose thermal expansion amount is greater than that of carbon. However, since the formation of the void layer around the surface of each refractory raw material particle causes deterioration in material strength, it is necessary to adjust the thickness of the void layer while achieving a balance between the thermal expansion amount and the strength, damage or the like.

With regard to the ratio of a void layer thickness to a particle size (void layer thickness ratio per particle: MS value (microspace value)), the MS value becomes smaller along with an increase in the particle size, and becomes larger along with a decrease in particle size. Thus, knowing the MS value of a coarse particle is equivalent to knowing the lower limit of the void layer thickness ratio per particle in the microstructure of a refractory material, so that it allows thermal shock resistance of the refractory material to be roughly evaluated.

As used herein, the term "MS value" means a ratio of the void layer thickness L between a coarse particle and a carbonaceous matrix (where L is the sum of void layer thicknesses on opposite sides of the particle) to the diameter D of the coarse particle, and calculated by the following formula:

$$MS=L/D\times100(\%)$$

A method of calculating the MS value (%), i.e., the void layer thickness ratio per particle, conducted by the present inventors, is shown as follows.

Through microscopic observation of the microstructure of a refractory material, ten coarse particles are selected in descending order of particle size, and after drawing a largest circle inscribing the contour (outline) of each of the selected particles, within the plane of the particle, an arbitrary line passing through the center of the circle is drawn. Further, three lines passing through the center of the circle are drawn at a 45-degree pitch with reference to the arbitrary line. That is, total four lines are drawn per particle. Then, a length (D1, D2, D3, D4) between two contour points of the particle located at opposite ends of each of the four lines, and the sum (L1, L2, L3, L4) of two thicknesses of a void layer lying in an interface between the particle and the carbonaceous matrix, on the opposite end sides of each of the lines, are measured. Then, MS1, MS2, MS3 and MS4 are calculated by the above formula using the values obtained using the four lines, and an average of the values is calculated as the void layer thickness ratio per particle, i.e., MS value. As above, the MS values of the preliminarily selected ten particles are calculated individually by the above method, and averaged to obtain the MS value of the microstructure of the refractory material.

The reason that the particles are selected in descending order of particle size is as follows.

A change in the volume of the raw material particle in the microstructure of the refractory material due to thermal expansion of the raw material particle exerts a large influence on thermal shock resistance, i.e., as the size of the particle becomes larger, a change in the volume or length thereof due to thermal expansion becomes larger, and the influence on thermal shock resistance becomes larger. Thus, the MS value serving as an index for evaluating and adjusting thermal shock resistance needs to be calculated based on relatively large raw material particles in the microstructure of the refractory material.

It has been confirmed that the thickness of the void layer on the surface of each particle, which allows an expansion lowering effect to be exhibited while achieving a balance between strength and corrosion-erosion/abrasion resistance, is 0.05% to 1.5%, in terms of the ratio of the thickness of the void layer on the surface of the largest particle to the particle size of the largest particle. The void layer exists on the surface of each particle at two position on opposite sides of the particle. Thus, when expressing the above ratio by the MS value, i.e., the ratio of the sum of thicknesses of the void layer on opposite sides of the largest particle to the diameter of the largest particle, the physical properties improvement effect is exhibited when the MS value is 0.1% to 3.0%.

For example, the thermal expansion rate of raw material particles (aggregate particles) of the CaO—ZrO$_2$ composition is maximum when CaO=60% by mass, and 1.5% at 1500° C. Estimating that the thermal expansion rate of the carbonaceous matrix surrounding the particles is 0.4% at 1500° C., a difference therefrom is 1.1%. A casting temperature in continuous casting of steel is about 1500° C. Thus, in order to prevent each particle from filling a void space of the void layer due to an expansion amount thereof at 1500° C. to cause the void space to disappear, the void layer may have a thickness of 1.1% or more of the particle size. In this case, the high-expansion aggregate will not come into contact with the carbonaceous matrix until reaching 1500° C.

As a result, a macroscopic thermal expansion amount of the refractory material in a temperature range less than 1500° C. is dominated by a thermal expansion amount of the carbonaceous matrix, without following the conventional additivity rule, so that it becomes possible to allow the refractory material to exhibit a significantly low-expansion property. Thus, from a viewpoint of thermal expansion amount, the lowering of expansion can be realized by allowing each particle to have a lager void layer thickness ratio (expansion allowance). Further, in order to allow such a low-expansion property to be significantly exhibited, the carbonaceous matrix needs to three-dimensionally continue, and it is desirable to use particles having a particle size distribution including a not-so-large amount of fine powder.

From a computational point of view, 1.1% is enough for the MS value, as mentioned above. However, the present inventors have found that, in the microstructure of an actual refractory material, a range of the MS value capable of achieving a balance between the strength and the thermal expansion rate is extended up to a value (3.0%) slightly greater than 1.1%. If the MS value is greater than 3.0%, the above undesirable situation will occur all over the microstructure at the level of the casting temperature, thereby leading to deterioration in macroscopic material strength, and deterioration in physical properties such as corrosion-erosion resistance and abrasion resistance.

If the MS value is less than 0.1%, the expansion lowering effect cannot be obtained although the mechanical strength is good.

In order to control such an MS value, basically, the content of one or more components selected from the group consisting of B$_2$O$_3$, TiO$_2$, P$_2$O$_5$, and V$_2$O$_5$ as described in the requirement (c) may be adjusted to adjust the thickness of the inorganic film.

As above, in the present invention, a void layer is formed around each refractory particle which is a free CaO-containing CaO—ZrO$_2$ composition, in the microstructure of a refractory material, so that it becomes possible to reduce the thermal expansion rate of the refractory material comprising refractory particles each of which is the free CaO-containing CaO—ZrO$_2$ composition, thereby overcoming a weakness in thermal shock resistance due to a high expansion property of the refractory particles, and allowing the refractory material to be applied to various applications including a casting nozzle.

Here, in a casting temperature range (about 1500° C.), the thickness of the void layer around each refractory particle which is the free CaO-containing CaO—ZrO$_2$ composition is reduced by expansion of the particle itself, so that there is almost no risk that this void layer causes deterioration in corrosion-erosion resistance, strength, etc., of the refractory material during casting of steel.

In the present invention, a technique of forming the inorganic film is based on a similar mechanism to that of the technique disclosed in the aforementioned Patent Document 2.

However, an effect of this technique cannot be realized even by using a conventional CaO—ZrO$_2$ composition (raw material) simply containing free CaO (in which most of CaO crystals have a width of greater than 50 μm), such as a composition having a chemical composition whose CaO content is the same as conventional ones, e.g., a lime composition, or a conventional CaO—ZrO$_2$ composition in which the width of each CaO crystal is relatively large. That is, the present inventors have found that the effect can be realized only if the CaO—ZrO$_2$ composition (raw material) of the present invention is used.

The reason is considered to be that in the conventional free CaO-containing CaO—ZrO$_2$ composition (raw material), the width of each CaO crystal is relatively large, and therefore the inorganic film formed on the surface of the free CaO and between respective adjacent ones of the CaO crystals and the CaZrO$_3$ crystals cannot be formed or maintained without any defects and in a continuous and stable state.

The refractory material of the present invention may further further contains one or more selected from the group consisting of SiC, metal Si, and B$_4$C.

These components contribute to suppressing oxidation of a carbon component due to oxygen, and oxidizing and reducing reactions of the carbon component with an oxide, to protect the carbon component and the microstructure of the refractory material, and provide an effect of increasing the strength of the refractory material.

In this case, in a chemical composition after hearing in a non-oxidizing atmosphere at 1000° C., when SiC is selected, the content thereof is preferably 10% by mass or less, and when Si and/or B$_4$C are selected, the content of either one or both thereof is preferably 2% by mass or less.

If the content of SiC is greater than 10% by mass, wear (chemical wear) increases. If the content of either one or both Si and B$_4$C is greater than 2% by mass, thermal shock resistance tends to deteriorate, although the strength-improving effect is obtained.

Effect of Invention

The CaO—ZrO$_2$ composition of the present invention can provide a raw material of a refractory material having significantly excellent slaking resistance and thermal shock resistance.

By incorporating the CaO—ZrO$_2$ composition of the present invention into a refractory material, it becomes possible to obtain a CaO—ZrO$_2$ based refractory material with a high CaO content which has not been achievable by a conventional CaO—ZrO$_2$ based refractory material.

Particularly, it is possible to provide a carbon-containing refractory material capable of obtaining an effect of significantly preventing adhesion of alumina-based inclusions in molten steel, while exhibiting significant slaking resistance, high corrosion-erosion resistance by suppressing self-fluxing, and significant thermal shock resistance.

By disposing the refractory material of the present invention in a casting nozzle or the like, it becomes possible to, particularly in continuous casting of steel during which adhesion of inclusions such as alumina to an inner bore of the casting nozzle is likely to occur, perform a stable casting operation over a long period of time.

This can also contribute to improvement and stabilization of steel quality, etc. This casting nozzle is suitably used, particularly, in continuous casting of high-grade steel requited to significantly reduce the amount of inclusions.

BRIEF DESCRIPTION OF DRAWINGS

FIGS. 5A-5C illustrate one configuration of an immersion nozzle using the refractory material of the present invention, wherein the refractory material of the present invention is used as a nozzle body of a casting nozzle.

FIG. 6 illustrates an example of facility for continuous casting of steel, wherein a casting nozzle is installed.

FIG. 10 is a schematic explanatory diagram of an in-molten steel rotation test method.

FIGS. 11A and 11B illustrate a test piece for an in-molten steel rotation test, wherein FIG. 11A and FIG. 11B are, respectively, a front view and a plan view of the test piece.

FIGS. 12A and 12B are schematic explanatory diagrams of an adhesion/wear rate measurement method in the in-molten steel rotation test, wherein FIG. 12A and FIG. 12B illustrate, respectively, the states of a sample before and after the test.

FIG. 13 is a schematic explanatory diagram of a test method for measuring molten steel contamination (change in carbon amount) caused by the refractory material.

FIGS. 14A and 14B illustrate a test piece for a refractory material-caused molten steel contamination (carbon amount change) measurement test, wherein FIG. 14A and FIG. 14B are, respectively, a front view and a bottom view of the test piece.

FIG. 15 is Table 1.
FIG. 16 is Table 2.
FIG. 17 is Table 3.
FIG. 18 is Table 4.
FIGS. 19 and 20 are Table 5.
FIG. 21 is Table 6.
FIGS. 22 and 23 are Table 7.
FIG. 24 is Table 8.
FIG. 25 is Table 9.
FIG. 26 is Table 10.

DESCRIPTION OF EMBODIMENTS

Figure 1:
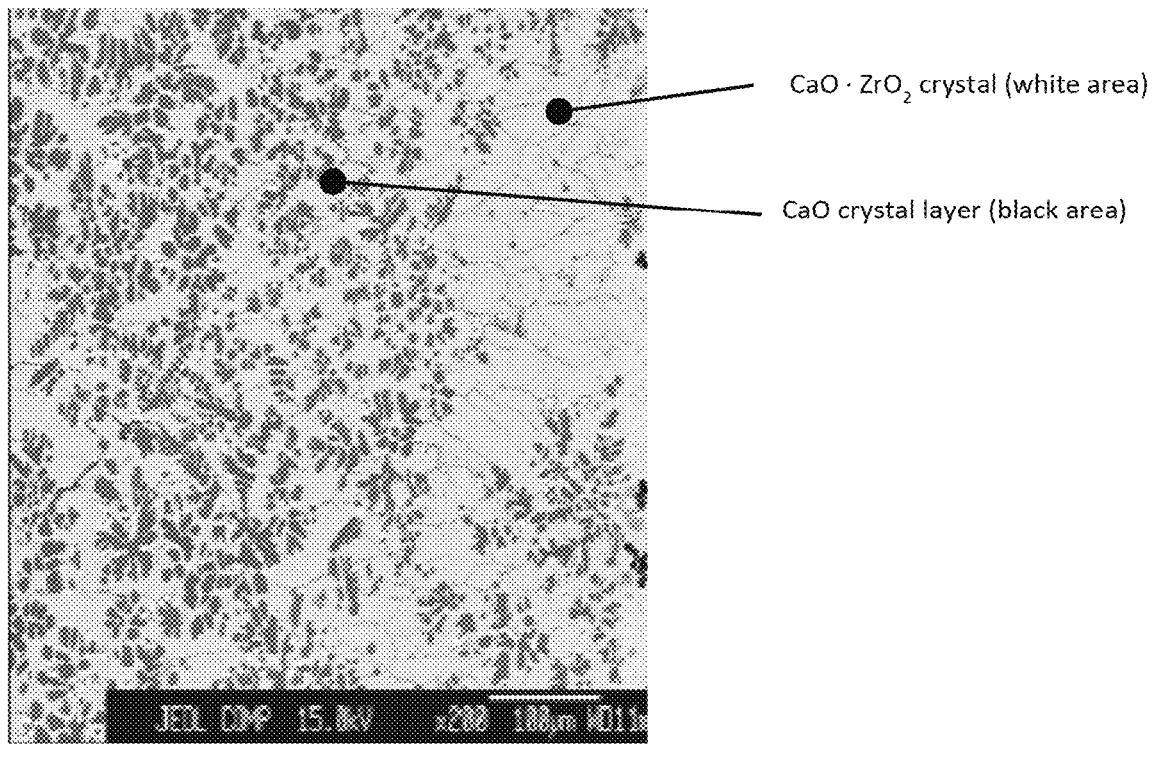
FIG. 1 is a microscope photograph showing an example of a CaO—ZrO$_2$ composition of the present invention (CaO=60% by mass).

The CaO—$ZrO_2$ composition of the present invention can be generally produced by a method comprising the following steps.

(1) A step of blending a CaO raw material and a $ZrO_2$ raw material together, and heating, by an electromelting method or the like, the resulting bend to a molten state at a temperature equal to or greater than that of a liquidus line for a composition of CaO and $ZrO_2$, and (2) a step of cooling the blend from the molten state to a temperature of a solidus line for the composition at a cooling rate of 10° C./sec or more.

The CaO raw material means a raw material composed of a CaO compound whose CaO content becomes equal to or greater than 95% by mass after heat treatment under a condition of about 1000° C. or more. As the CaO raw material, it is possible to use, e.g., one or more selected from the group consisting of quicklime, and CaO compounds each of which becomes CaO, except for unavoidable impurities, at a temperature during melting (at a temperature of 830° C. or more), such as calcium carbonate and calcium hydrate.

As the $ZrO_2$ raw material, it is possible to use, one or more selected from the group consisting of unstabilized zirconia (vaterite), fully-stabilized zirconia, and partially-stabilized zirconia.

Among them, the most inexpensive unstabilized zirconia (vaterite) is preferable from a viewpoint of raw material cost.

When using the fully-stabilized zirconia or partially-stabilized zirconia, it preferably uses CaO as a stabilizing agent because a target is the CaO—$ZrO_2$ composition. Although another stabilizing agent such as $Y_2O_3$ or MgO may also be used, a raw material composition is preferably set such that components including unavoidable impurities (the components will hereinafter be collectively referred to as "impurities"), other than the CaO component and the $ZrO_2$ component contained in the composition of the present invention, is about 6% by mass or less, preferably about 3% by mass or less. If the content of the impurities excessively increases, slaking resistance, etc., of the CaO—$ZrO_2$ composition is likely to deteriorate.

As the $ZrO_2$ raw material, it is also possible to use a material uniquely subjected to pulverization and granulating, and a commercially-available arenaceous material.

The size (particle size) of each starting material is preferably 10 mm or less, more preferably about 3 mm or less.

However, with a view to improving flowability during input to an electric furnace or the like, a finely-powdered raw material having a particle size of 3 mm or less is formed into a large secondary particle or a pellet having a diameter of 10 mm or less.

If the particle size of the raw material is greater than 10 mm, it is necessary to take a long time for melting, and the amount of power consumption tends to increase, leading to deterioration in productivity and increase in production cost. From a viewpoint of avoiding the deterioration in productivity and the increase in production cost, it is preferable to use as small particles as possible, but the minimum particle size may be determined comprehensively by considering other factors such as slaking and dust generation.

With regard to the CaO raw material, the size of the CaO raw material tends to exert an influence on the width of each of the CaO crystals although it is also related to a melting duration and temperature. Specifically, as the CaO material has a smaller size, the width of each of the CaO crystals can be more easily reduced. Thus, the size of the CaO material is preferably as small as possible in the range of about 3 mm or less.

If the rate of cooling from the molten state to the solidus line temperature is small, the size (width) of each of the CaO crystals in the obtained CaO—$ZrO_2$ composition becomes large, and the area of the CaO crystal exposed on the surface of the composition becomes large, leading to deterioration in slaking resistance.

By setting the rate of cooling from the molten state to the solidus line temperature to 10° C./sec or more, it becomes possible to reduce the size (width) of each of the CaO crystals to about 50 μm or less. However, depending on the size of a melting facility or a melting unit (size of a melting bath), there arises a difference in temperature i.e., a difference in cooling rate, between the inside and the outside of a molten material or between a cooled surface and the inside of the molten material. Thus, in order to perform uniform cooling of the entire molten material, it is preferable that the cooling rate is as large as possible.

A specific method for rapid cooling is not particularly limited, but may use: a technique of pouring the molten material onto an iron plate to rapidly cool the molten material; a technique of pouring the molten material into a cooling metal mold provided with a cavity; a technique of rapidly cooling the molten material using an atomizer; and a technique of blowing away the molten material using compressed air, and the structure and equipment of the facility may be arbitrarily selected according to properties required as the raw materials.

A temperature measurement method to know the cooling rate may be any measurement method usable as appropriate. For example, it is possible to use a technique of actually measuring the rate of cooling of a target material from its molten state to solidification by using a non-contact thermometer such as infrared thermography, an optical fiber thermometer, a thermocouple, etc., together, and a technique of computationally estimating an average cooling rate by CAE analysis based on the actually measured data.

In the field site, the following simple method may also be employed.

For example, in the technique of pouring the molten material into a cooling metal mold, the temperature of the molten material is preliminarily measured, and, on the assumption that a time point when flowability of the molten material in the cooling metal mold is lost after pouring the molten material into the cooling metal mold corresponds to a time point when the molten material reaches the solidus line temperature, a value obtained by subtracting the solidus line temperature from the preliminarily-measured temperature of the molten material, and dividing the obtained difference by a time from the pouring through until the flowability is lost is deemed to be the cooling rate.

The obtained CaO—$ZrO_2$ composition is pulverized and granulated to have a given particle size composition.

After the granulating, the $CaO$—$ZrO_2$ composition needs to be stored and used in a state in which it is not exposed to water, and a high-temperature and high-humidity environment. Further, the $CaO$—$ZrO_2$ composition may be subjected to carbonation treatment, as needed.

As mentioned above, in order to lower the thermal expansion rate to reduce the risk of breaking due to thermal shock or thermal expansion difference during preheating or casting, the void layer may be formed around the particle. The formation of the void layer can be promoted by preliminarily subjecting the $CaO$—$ZrO_2$ composition to surface treatment. A coating layer on the surface of the particle is preferably a hydrate, chloride or carbonate layer formed through a chemical reaction with $CaO$ to have a given thickness. Specifically, the hydrate, chloride or carbonate layer having a given thickness is formed by a technique of allowing water or water-containing gas to come into contact with the surface of the $CaO$—$ZrO_2$ composition particle for a given period of time, or a technique of allowing an acid/alkali solution or gas to come into contact with the surface of the $CaO$—$ZrO_2$ composition particle.

Although the refractory material of the present invention contains the $CaO$—$ZrO_2$ composition of the present invention, as a primary raw material, a zirconia-based raw material or an unstabilized zirconia raw materials having a $CaO$ content less than that of the $CaO$—$ZrO_2$ composition, or $CaO$-based raw material such as dolomite clinker, may coexist with the $CaO$—$ZrO_2$ composition, as described above.

The refractory material of the present invention can be produced in a similar manner to a production method for a commonly-used $CaO$-containing refractory material, as with production of samples in the after-mentioned Experimental Examples.

For example, a binder is added to the $CaO$—$ZrO_2$ composition serving as a refractory raw material (refractory particles), and after kneading, the resulting mixture is adjusted to a state suitable for shaping. Then, the mixture is shaped by CIP (Cold Isostatic Pressing), and the resulting shaped body is subjected to drying at a temperature of about 300° C. or less. Then, dried body is subjected to heat treatment in a non-oxidizing atmosphere at a temperature of about 800° C. to about 1200° C. Further, the refractory material may be subjected to carbonation treatment, as needed.

The refractory material of the present invention may contain one or more oxides selected from the group consisting of $B_2O_3$, $TiO_2$, $P_2O_5$, and $V_2O_5$.

For example, as a preferred $B_2O_3$ source, it is possible to use diboron trioxide and borate ester, and further to use sodium tetraborate, sodium metaborate, etc.

As a $TiO_2$ source, it is possible to use titanium oxide or the like, organic titanium compounds, etc.

As a $P_2O_5$ source, it is possible to use a commercially-available commonly-used product.

As a $V_2O_5$ source, t is possible to use vanadium oxide.

The one or more oxides selected from the group consisting of $B_2O_3$, $TiO_2$, $P_2O_5$, and $V_2O_5$ need to be uniformly dispersed without any segregation around each of the $CaO$-containing particles. As a method to realize this, it is preferable to use these raw materials as fine powders or in a liquid state (including emulsion, suspension, etc.).

As a carbon source, it is possible to use a carbon raw material having a binding function (hereinafter referred to as "binding carbon raw material"). As the binding carbon raw material, it is preferable to use a phenolic resin, a furan resin, pitch or tar, which leaves residual carbon as a binding network at a high rate after burning in a non-oxidizing atmosphere. With regard to the form of raw materials, it is possible to use a raw material which is in liquid form at room temperature, or which is in solid form at room temperature but softened or liquidized along with an increase in temperature.

In addition to the above binding carbon raw materials, a solid carbonaceous raw material may be arbitrarily used. As the solid carbonaceous raw material, it is possible to use a particle-shaped carbonaceous raw material such as graphite or carbon black, or a fiber-shaped carbonaceous raw material such as carbon fibers.

However, it is necessary that these carbonaceous raw materials are added to a raw material mixture in an amount obtained by adding, to a carbon component amount necessary as a refractory material, the percent of disappearing components in the binding carbon raw material (percent of the remainder after subtraction of the percent of residual carbon), the percent of a loss of the solid carbonaceous raw material (percent of impurities eliminated by heating, etc.), i.e., such that the percent of the entire refractory product, i.e., such that the resulting sum falls within the range of 2% by mass to 35% by mass of the entire refractory product, in terms of a chemical composition measured in a product stage, i.e., measured after the refractory product has undergone heating in a non-oxidizing atmosphere at 1000° C.

In order to allow the raw material becoming $B_2O_3$, $TiO_2$, $P_2O_5$ or $V_2O_5$ to be uniformly dispersed around each of a plurality of $CaO$—$ZrO_2$ composition particles during kneading of the mixture, it is preferable that the raw material becoming $B_2O_3$, $TiO_2$, $P_2O_5$ or $V_2O_5$ is prepared in the form of a liquid or fine particles, and added and kneaded to come into direct contact with each of the $CaO$—$ZrO_2$ composition particles.

In the case where the refractory material contains one or more oxides selected from the group consisting of $B_2O_3$, $TiO_2$, $P_2O_5$, and $V_2O_5$, through the aforementioned heat treatment, an inorganic film comprised of a compound of $CaO$ and one or more components selected from the group consisting of $B_2O_3$, $TiO_2$, $P_2O_5$, and $V_2O_5$ is formed on surfaces of at least the $CaO$ crystals in each of the $CaO$—$ZrO_2$ composition particles, wherein the inorganic film has a thickness of 0.1 μm to 15 μm. The thickness of the inorganic film can be measured by microscopic microstructure observation, X-ray microanalyzer analysis, or the like. The thickness of the inorganic film can be controlled by a technique of variously changing an addition percent of the raw material becoming $B_2O_3$, $TiO_2$, $P_2O_5$ or $V_2O_5$, etc.

Although the upper limit of the heat treatment temperature needs not be particularly limited, it is substantially set to about 1300° C., preferably about 800° C. to about 1200° C., by economical reason. In view of the level of reaction progress and economic efficiency, the duration of the heat treatment is in the range of about to 6 hours at a maximum heat treatment temperature.

The slaking resistance of the $CaO$—$ZrO_2$ composition particles each provided with the inorganic film formed as above can be further enhanced by carbonation treatment.

This carbonation treatment is performed such that the resulting $CaCO_3$ is formed in an amount of 0.1% by mass to about 2.5% by mass. If the content of $CaCO_3$ is greater than 2.5% by mass, a large change in molten steel level in a mold, i.e., so-called "boiling phenomenon", undesirably becomes prominent due to a decomposed gas of $CaCO_3$ in an initial stage of casting. On the other hand, if the content is less than 0.1% by mass, slaking resistance is likely to deteriorate.

In order to lower the thermal expansion rate to reduce the risk of breaking due to thermal shock or thermal expansion difference during preheating or casting, the refractory material of the present invention may be prepared to have a microstructure in which a void layer with a thickness of 0.1 to 3.0% in terms of the MS value (%) is formed between the carbonaceous matrix and each of the CaO—ZrO$_2$ composition particles, in the aforementioned manner.

In order to form the void layer at the surface of the free CaO component-containing CaO—ZrO$_2$ composition particle, a hydrate, chloride or carbonate layer having a given thickness can be formed by adjusting the thickness of a pretreated layer on the surface of the CaO—ZrO$_2$ composition, i.e., a technique of allowing water or water-containing gas to come into contact with the particle for a given period of time, or a technique of allowing an acid/alkali solution or gas to come into contact with the particle, in a raw material stage or in a heat treatment step of a production process of the refractory material. Alternatively, a similar effect can be obtained by a technique of preliminarily adding hydroxide or carbonate to form a compound layer on CaO surfaces through heat treatment in a production stage or heat receiving in a casting stage.

The above-mentioned given thickness is not a fixed value, but may be set on a case-by-case basis depending on specific design conditions, while taking into consideration the level of expansion and shrinkage characteristics depending reaction and others varying according to a component necessary when forming a coating layer, so as to appropriately adjust the thickness of the void layer (void space) with respect to the size of each particle whose surface is to be formed with the coating layer, to fall within the above-mentioned range of the MS value.

Such a coating layer (hydrate layer, carbonate layer, etc.) on the surface of the CaO—ZrO$_2$ composition is decomposed during the heat treatment, and an area in which this layer has existed is formed as a porous layer. Further, since the area in which the coating layer has been decomposed is porous and active, it exhibits high reactivity with the one or more components selected from the group consisting of B$_2$O$_3$, TiO$_2$, P$_2$O$_5$ or V$_2$O$_5$ to form a film composed of a compound with the one or more components. In the reaction or film-formation stage, the one or more components are densified, and consequently the volume of the area shrinks. Thus, at the time when the heat treatment is completed, a certain range of void space is formed between the film formed on the surface of each of the CaO—ZrO$_2$ composition particles having a high thermal expansion property, and a carbonaceous component-based matrix.

The inventors have found that the formation of such a uniform film is a phenomenon unique to the CaO—ZrO$_2$ composition of the present invention containing CaO crystals each having a relatively narrow width, and such a phenomenon never occurs in a conventional CaO—ZrO$_2$ composition containing CaO crystals each having a relatively wide width.

More specifically, the inventors have found that as long as the CaO—ZrO$_2$ composition of the present invention containing CaO crystals each having a relatively narrow width is used, such a film is formed not only on the surfaces of the CaO crystals, but also on the surfaces of CaO.ZrO$_2$ (Ca-ZrO$_3$) crystals in a eutectic microstructure with the CaO crystals, in a continuous manner. On the other hand, in the conventional CaO—ZrO$_2$ composition containing CaO crystals each having a relatively wide width, such a film is formed on only the surfaces of the CaO crystals unstably (intermittently), and is more likely to drop off. Thus, a refractory material using, as a raw material, the conventional CaO—ZrO$_2$ composition containing CaO crystals each having a relatively wide width fails to improve slaking resistance thereof, Although this mechanism is not exactly clear, considering the fact discovered by the present inventors that, by increasing a cooling rate during production of clinker, a eutectic microstructure is formed in which a CaO.ZrO$_2$ crystal and a CaO crystal are alternately and finely arranged, wherein the content of CaO is slightly higher in the inside of the CaO.ZrO$_2$ crystals, it is estimated that high-temperature melt is solidified in a supercooling state, resulting in a CaO rich composition, and as a result of the presence of an excessive CaO in the CaO.ZrO$_2$ crystals, diffusion of CaO ions in the CaO.ZrO$_2$ crystals is facilitated, whereby a film is also formed on the surfaces of the CaO.ZrO$_2$ crystals, in a manner continuous with a film on the surfaces of CaO crystals.

The thickness of the void layer, i.e., the thickness of the coating layer to be formed on the surface of each particle in an initial stage, can be adjusted by variously changing the concentration of gas or the like serving as a treatment agent, such as carbon dioxide gas or water vapor, a treatment temperature, a treatment duration, a pressure, etc.

Further, the refractory material obtained by forming a void space at the surface of each of the CaO component-containing particles, and then forming a film of a compound of CaO and one or more oxides selected from the group consisting of B$_2$O$_3$, TiO$_2$, P$_2$O$_5$ and V$_2$O$_5$ may also be subjected to carbonation treatment. This makes it possible to allow a CaO-containing refractory material to have a void space and a strong CaO-based protective film, around each CaO component-containing particle, and thereby exhibit not only significantly excellent resistance to thermal shock and thermal expansion difference but also significantly excellent slaking resistance.

The refractory material of the present invention obtained in the above manner can be disposed in a part or the entirety of a region to be subjected to contact with molten steel to suppress adhesion of molten steel-derived non-metallic inclusions, such as alumina, onto the surface of the refractory material. Thud, the refractory material of the present invention is suitably usable for a casting nozzle.

FIG. 5A illustrates an example of an immersion nozzle (casting nozzle) formed of a single layer which is composed of the refractory material 20 of the present invention described in any one of the sections (6) to (11), and disposed in a part of a region to be subjected to contact with molten steel to have a molten steel contact surface (surface to be subjected to contact with molten steel) and a back surface opposed thereto. In FIG. 5A, the refractory material 20 of the present invention may also be disposed in an area of a power line material 21. This provides an immersion nozzle (casting nozzle) formed of a single layer which is composed of the refractory material of the present invention, and disposed in the entirety of the region to be subjected to contact with molten steel to have a molten steel contact surface and a back surface opposed thereto. Although FIG. 5A shows one example of a cylindrical-shaped casting nozzle, a casting nozzle to which the refractory material of the present invention is applicable is not limited to such a cylindrical-shaped casting nozzle, but the refractory material of the present invention can be applied to various casting nozzles without any restriction on shape, e.g., casting nozzles having various shapes, such as a flat shape, an oblong shape, and a funnel-like shape (whose upper portion is diametrically-expanded), to be mainly used for casting of thin slab, as shown in FIG. 5B.

FIG. 5C illustrates an example of an immersion nozzle having a shape similar to that of the immersion nozzle in FIG. 5A and having a function of blowing or injecting gas from a part of an inner bore portion (inner bore wall) thereof into molten steel. In this example, a refractory material 22G having high gas permeability (hereinafter referred to as "gas-permeable refractory material") is disposed in a part of the inner bore portion. This gas-permeable refractory material may be a commonly-used alumina-graphite based gas-permeable refractory material, or may be a refractory material improved in porosity and gas permeability, while maintaining the refractory composition of the present invention. In addition to gas supply into molten steel from the immersion nozzle as illustrated in FIG. 5C, gas may be additionally supplied into molten steel from another region in a molten steel flow passage, such as upper nozzle or a sliding nozzle located upstream of the immersion nozzle.

Examples of a casting nozzle to which the refractory material of the present invention is applicable or suitably applied, other than the immersion nozzle, include a tundish nozzle (including an upper nozzle, and an open nozzle), an intermediate nozzle, and a flow control nozzle (particularly, inner bore).

For example, a left part of FIG. 6 shows an example of an externally mounted-type immersion nozzle in a structure whose nozzle part serving as a molten steel flow passage during discharge of molten steel from the inside of a casting vessel is composed of a plurality of casting nozzles. The refractory material of the present invention can be applied to not only an immersion nozzle F but also any of various other casting nozzles, such as an upper nozzle A, a sliding nozzle plate B, a lower nozzle C and a long nozzle D, in the above structure, and can be disposed in a part or the entirety of a surface of the casting nozzle to be subjected to contact with molten steel. The refractory material of the present invention can also be applied to a so-called "insertion-type immersion nozzle (right part of FIG. 6) in which a nozzle part serving as a discharge passage is formed in an integral structure, a so-called "open nozzle" which is not immersed in molten steel, etc. Further, the refractory material of the present invention can be applied to a stopper E located above a nozzle part to control the flow volume of molten steel or open and close the nozzle part, and a lining refractory material G of a molten steel vessel.

A casting nozzle having single-layer structure can reduce the risk of breaking due to thermal expansion difference, etc., and can employ a simple production method. In production of such a single-layer casting nozzle, based on the aforementioned production method, a raw material mixture for the refractory material of the present invention may be filled in a target region in a CIP-molding mold.

A position and level of adhesion of non-metal inclusions such as alumina on the surface of the refractory material vary depending on individual casting conditions. Thus, a "part" or the "entirety" of the region to be subjected to contact with molten steel is not a fixed area, but is determined by selecting the most desired area as a target to suppress the adhesion, with respect to each of the individual casting conditions. In other words, a "part" or the "entirety" of the region is an arbitrarily determinable matter.

Figures 7A, 7B, 7C:
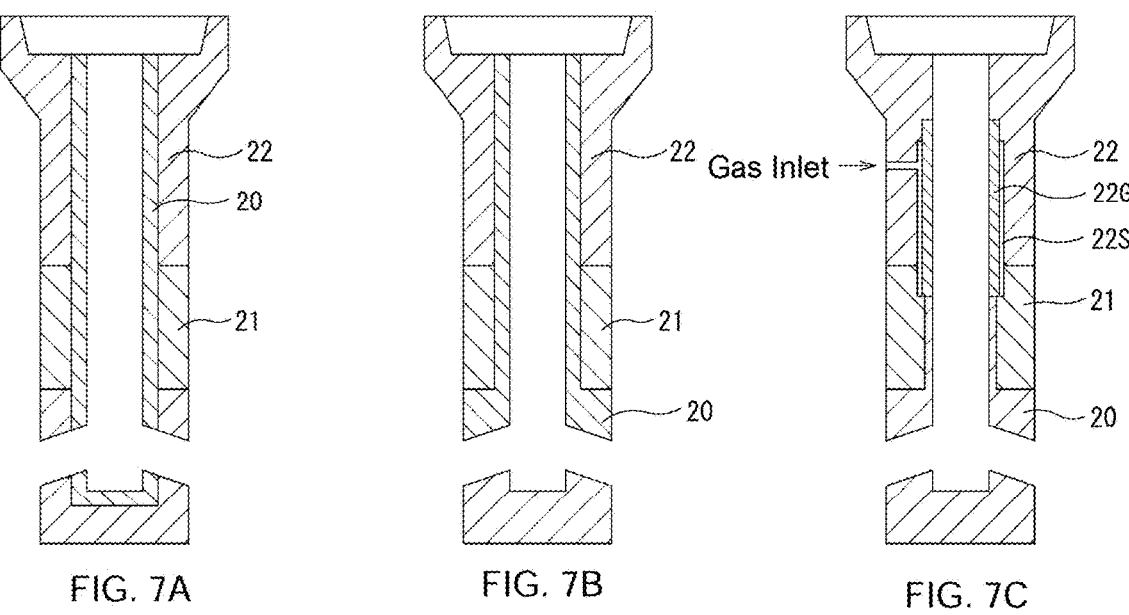
FIG. 7A-7C illustrate one configuration of an immersion nozzle (casting nozzle) using the refractory material of the present invention, wherein the refractory material of the present invention is used mainly as a member of the casting nozzle having a molten steel contact surface.

FIGS. 7A-7C illustrate several examples of an immersion nozzle (casting nozzle) comprising a plurality of layers which include: a first refractory layer composed of the refractory material 20 of the present invention and disposed in a part or the entirety of a molten steel contact surface; and a second refractory layer (a powder line material 21 and a nozzle body material 22) composed of a refractory material having a composition different from that of the refractory material 20 of the present invention and disposed on the back side of the first refractory layer, wherein adjacent ones of the plurality of layers are integrated together in direct contact relation to each other.

Specific examples of the refractory material on the back side of the first layer (the powder line material 21 and the nozzle body material 22) include: a refractory material comprising carbon and refractory particles comprised of one or more selected from the group consisting of $Al_2O_3$, $SiO_2$ and $ZrO_2$, or a compound thereof; and a refractory material which is similar to the refractory material of the present invention but is different in terms of composition, etc., from the refractory material disposed in a part or the entirety of the region to be subjected to contact with molten steel. Examples of the latter include a refractory material which is different in terms of; the mass ratio of the CaO component to the $ZrO_2$ component; the carbon content; whether or not there is a component such as $SiO_2$, SiC or metal Si; the amount of such a component; or the particle size composition of a refractory raw material. The casting nozzle having this structure is effective in a case where high corrosion-erosion resistance to powder in a mold is required. That is, this casting nozzle is intended to simultaneously achieve an improvement to a durability determinant factor other than adhesion of non-metal inclusions.

It is to be understood that the first refractory layer having the molten steel contact surface as shown in FIGS. 7A-7C and that the second refractory layer disposed on the back side of the first refractory layer may be composed of a refractory material having the same composition as the refractory material 20 of the present invention.

In production of the above casting nozzle formed of such a plurality of layers, based on the aforementioned production method, after partitioning a raw material mixture filling space in a target region inside a CIP-molding mold, at a position apart radially outwardly from a position corresponding to the molten steel contact surface by a given distance, one of the two partitioned spaces (on the side of a core bar) may be filled with a raw material mixture for the refractory material of the present invention, and the other back-side space may be filled with a raw material mixture for the above-mentioned refractory material comprising carbon and refractory particles comprised of one or more metal oxides selected from the group consisting of $Al_2O_3$, $SiO_2$ and $ZrO_2$, or a compound thereof. Subsequently, after removing a jig such as a plate used for the partition before molding, CIP molding may be carried out.

Figure 8:
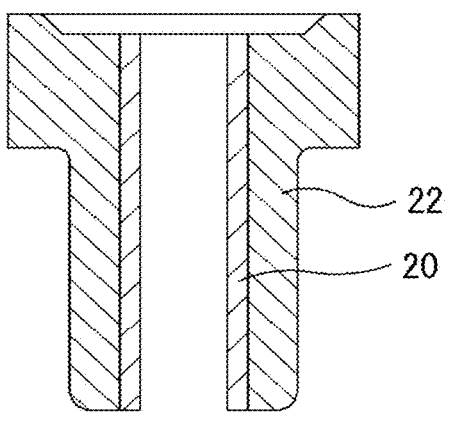
FIG. 8 illustrates one configuration of a lower nozzle (casting nozzle) using the refractory material of the present invention.
Figure 9:
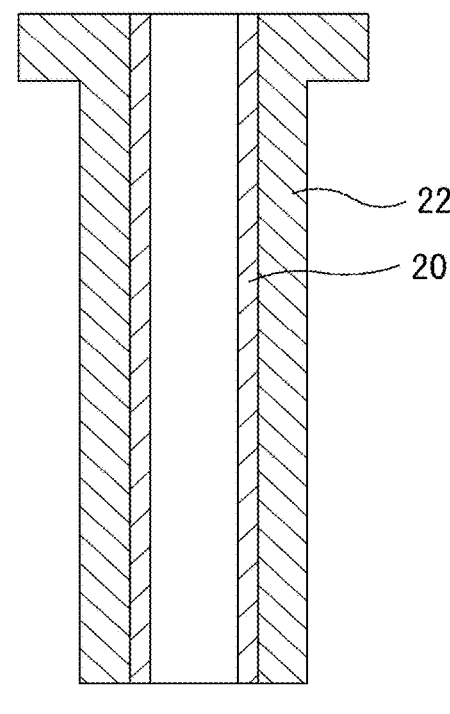
FIG. 9 illustrates one configuration of a long nozzle (casting nozzle) using the refractory material of the present invention.

FIG. 8 and FIG. 9 illustrate, respectively, a lower nozzle and a long nozzle each of which comprises a plurality of layers which include: a first refractory layer composed of the refractory material 20 of the present invention and disposed in a part or the entirety of a molten steel contact surface; and a second refractory layer (a nozzle body material 22) composed of a refractory material having a composition different from that of the refractory material 20 of the present invention and disposed on the back side of the first refractory layer, wherein adjacent ones of the plurality of layers are integrated together in direct contact relation to each other, as with FIGS. 7A-7C.

EXAMPLES

Various examples will be described below.

Experimental Example A of CaO—$ZrO_2$ Compositions

In Experimental Example A of CaO—$ZrO_2$ compositions, a molten state of a mixture, the presence or absence of free CaO, the width of each CaO crustal, etc., were checked while changing the mass percent of each of a CaO raw material and a $ZrO_2$ raw material (starting materials).

Samples in Experimental Example A were obtained under the following conditions.

With regard to the starting materials (% by mass), as a CaO raw material (CaO source) quicklime having a particle size composition of 10 mm or less was used, and, as a $ZrO_2$ source, unstabilized zirconia (vaterite) having a particle size composition of 10 mm or less (generally 3 mm or less) was mainly used, or, in some samples, zirconia $ZrO_2$ substantially fully stabilized by CaO or MgO was used. The CaO-stabilized zirconia or the MgO-stabilized zirconia also has a particle size composition of 10 mm or less.

With regard to melting of a mixture of the starting materials, an electric furnace was used to raise the temperature of the mixture up to about 2800° C. to obtain a melt in an amount of about 0.5 t, and maintain the temperature until a given time of period set on a case-by-case basis elapses.

Conditions about the heating temperature, the heating duration, the melt amount, etc., in production of samples of the CaO—$ZrO_2$ composition in the after-mentioned other Experimental Examples, are the same as those in Experimental Example A.

With regard to the molten state of the mixture, the molten state was visually observed, wherein a sample which could have a good molten state within the given time of period, a sample which could have an intended molten state although it was attained after the elapse of the given time of period, i.e., a sample which could have an adoptable molten state, and a sample which had an incomplete molten state, were evaluated as ○ (excellent), Δ (good), and x (NG), respectively.

Then, the molten material was rapidly cooled by a process of expanding the molten material on a cooling iron plate having a thickness of about 20 mm to have a thickness of about 10 mm. With regard to measurement of the rate of the cooling, a time of period until the temperature of the molten material falls below the solidus line temperature (about 2260° C.) was measured, while the temperature of the surface of the molten material was monitored by an infrared thermography capable of measuring temperature up to 3000° C., and the cooling rate was calculated. In this Example, the cooling rate was 10° C./sec or more (16° C./sec to 18° C./sec).

With regard to the presence or absence of free CaO, the obtained CaO—$ZrO_2$ composition was cooled down to room temperature and granulated to have a particle size of 1 mm or less, and the cross-section (cut surface) of each particle composed of the CaO—$ZrO_2$ composition was subjected to microscopic microstructure observation, wherein a sample in which there is a free CaO crystal in an observation visual field was evaluated as ○ (allowable), and a sample in which there is no free CaO crystal in the observation visual field was evaluated as x (NG).

With regard to the width of the free CaO crystal, the width of each free CaO crystal in the cross-section of the particle, in the observation visual field in the microscopic microstructure observation, was measured and evaluated.

The content of free CaO in the CaO—$ZrO_2$ composition was computationally obtained from the mixing ratio of the starting materials. In the CaO—$ZrO_2$ composition of the present invention, the lower limit of the content of the CaO component is 40% by mass, and the lower limit of the mass ratio of the CaO component to the $ZrO_2$ component is 0.67, as mentioned above. This can be converted to a content of free CaO of 12% by mass. Therefore, a sample in which the content of free CaO computationally obtained from the mixing ratio of the starting materials is 12% by mass or more was evaluated as ○ (allowable), and a sample in which the content of free CaO computationally obtained from the mixing ratio of the starting materials was less than 12% by mass was evaluated as x (NG).

With regard to slaking resistance of the obtained CaO—$ZrO_2$ composition, the number of days before the increase rate of weight of a particle granulated to have a particle size of about 1 mm or less reaches +1.5% in a constant temperature and humidity environment (40° C., 90 RH %) was measured, wherein a sample in which the number of days was 1 (target value) or more was evaluated as ○ (allowable), and a sample in which the number of days was greater than 1 was evaluated as x (NG).

These evaluation results were comprehensively evaluated, wherein a sample satisfying the requirements as the CaO—$ZrO_2$ composition of the present invention was evaluated as ○ (acceptable), and a sample failing to satisfy any of the requirements was evaluated as x (unacceptable).

Details of each Example are shown in Table 1 (FIG. 15).

All of Inventive Examples could have CaO crystals each having a width of 50 μm or less.

Figure 2:
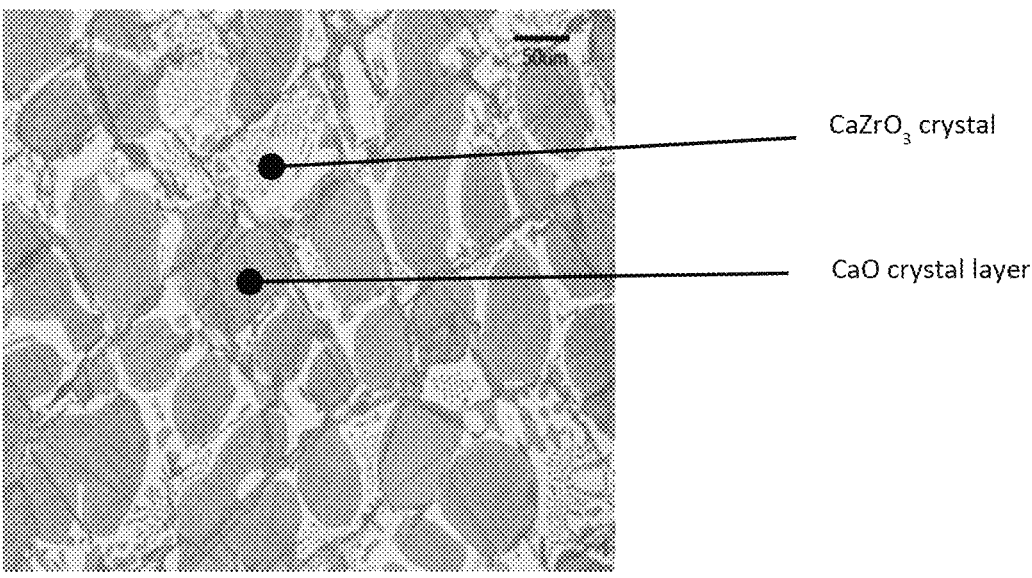
FIG. 2 is a microscope photograph showing an example of a conventional CaO—ZrO$_2$ composition (CaO=60% by mass).

For example, FIG. 1 is a microscope photograph showing a CaO—$ZrO_2$ composition in Inventive Example 1. It can be seen that this CaO—$ZrO_2$ composition includes a eutectic microstructure of CaO crystals and $CaZrO_3$ crystals, wherein the width of each of the CaO crystals is 50 μm or less. On the other hand, FIG. 2 is a microscope photograph showing a CaO—$ZrO_2$ composition obtained by melting a mixture of the same starting materials as those in Inventive Example 1, and then gradually cooling the mixture (cooling rate: less than 10° C./sec). It can be seen that this CaO—$ZrO_2$ composition includes a eutectic microstructure of CaO crystals and $CaZrO_3$ crystals, but most of the CaO crystals have a width of greater than 50 μm.

In Inventive Example 1 in which the mass ratio of the CaO raw material to the $ZrO_2$ raw material is 60/40, it took a longer time for reaching a sufficient molten state, as compared to other Inventive Examples. This means that deterioration in melting efficiency and in productivity such as yield, etc., and segregation, are more likely to occur, and thus it is necessary to pay attention to this in production.

In Comparative Example 1 in which the mass ratio of the CaO raw material to the $ZrO_2$ raw material is 61/39, the resulting CaO—$ZrO_2$ composition had a high melting point, and could not be sufficiently melted.

From the above results, it is considered that the upper limit of the mass ratio of the CaO raw material to the $ZrO_2$ raw material in production of the CaO—$ZrO_2$ composition of the present invention is reasonably or preferably set to 60/40.

In Comparative Example 2 in which the mass ratio of the CaO raw material to the $ZrO_2$ raw material is 39/61, the resulting CaO—$ZrO_2$ composition failed to contain 12% by mass or more of free CaO therein.

In Comparative Example 3 in which the mass ratio of the CaO raw material to the $ZrO_2$ raw material is 30/70, there was no free CaO in the resulting CaO—$ZrO_2$ composition.

With regard to the width of each free CaO crystal in each of Inventive Examples, it was slightly large, but still 50 μm or less, in Inventive Example 1, and was 20 μm or less in all other Inventive Examples.

With regard to the slaking resistance, all Comparative Examples could not attain the target value, i.e., one day or more, whereas all Inventive examples could satisfy the target value, i.e., one day or more.

Each of Inventive Example 5 using CaO-fully stabilized zirconia and Inventive Example 6 using MgO-fully stabilized zirconia could obtained a similar result to Inventive Examples each using unstabilized zirconia.

Experimental Example B of CaO—$ZrO_2$
Compositions

In Experimental Example A of CaO—$ZrO_2$ compositions, with regard to samples prepared by subjecting the CaO—$ZrO_2$ composition based on Inventive Example 2 in Experimental Example A to carbonation treatment to form a $CaCO_3$ film on the surface of the CaO—$ZrO_2$ composition, the relation between the thickness of the $CaCO_3$ film and slaking resistance was checked.

The carbonation treatment was carried out by subjecting the particles granulated to have a particle size of 1 mm or less by the same method as that in Experimental Example A to chemical reaction in a furnace containing $CO_2$ gas introduced therein and kept at a constant temperature equal to or less than the decomposition temperature of calcium carbonate. The thickness of the carbonate ($CaCO_3$) film on the surface of the CaO—$ZrO_2$ composition was adjusted by changing a staying time in the $CO_2$ gas, etc.

With regard to slaking resistance of each sample of the obtained CaO—$ZrO_2$ compositions, the number of days before the increase rate of weight reaches +1.5% in the constant temperature and humidity environment (40° C., 90 RH %) was measured in the same manner as that in Experimental Example A, and the number of days as a target (acceptable) value was more segmentalized, wherein a sample in which the number of days was greater than 5, a sample in which the number of days was 3 to 5, a sample in which the number of days was 1 to less than 3, and a sample in which the number of days was less than 1, are evaluated as ⊚ (excellent), ○ (good), Δ (allowable) and x (NG=unacceptable), respectively.

The result is shown in Table 2 (FIG. 16).

Even in Inventive Example 2 which is a CaO—$ZrO_2$ composition having the feature of the present invention although there is no carbonated film, the number of days was 5, which shows that it is usable for a refractory material constituting a casting nozzle or the like.

Inventive Examples 7 to 9 each having a relatively thick carbonated film show that as the thickness of the carbonated film becomes larger, the number of days before the increase rate of weight reaches +1.5% becomes larger. Each of the carbonated films in Inventive Examples was subjected to microscopic observation. As a result, it was confirmed that the carbonated film continuously covered the entire particle.

In Comparative Example 4 produced at a cooling rate after melting of less than 10° C./sec (is 8° C./sec), which is less than that in the method of the present invention, despite that it was subjected to carbonation treatment similar to that in Inventive Example 8, most of free CaO crystals had a width of greater than 50 μm, i.e., it failed to have the microstructure of the CaO—$ZrO_2$ composition of the present invention. Moreover, the carbonated film was unevenly formed, and there are many discontinuous areas (areas in each of which free CaO crystals were exposed to the surface of the composition) even in a region having the film (see the after-mentioned Experimental Example C of CaO—$ZrO_2$ Composition). Reflecting this, in the result of the slaking test, the number of dates was less than 1.

Experimental Example C of CaO—$ZrO_2$
Compositions

In Experimental Example C of CaO—$ZrO_2$ compositions, with regard to samples prepared based on Inventive Example 2 in the Experimental Example A while changing the cooling rate after melting, the relationship between the cooling rate and the width of each CaO crystal of the CaO—$ZrO_2$ composition, and the relationship between the cooling rate and slaking resistance were checked.

The adjustment of the cooling rate was performed by controlling a pouring rate to adjust the thickness of a molten material.

In Experimental Example C, all samples were not subjected to carbonation treatment.

Slaking resistance was evaluated by the same method and criteria as those in Experimental Example B.

The result is shown in Table 3 (FIG. 17).

It can be seen that as the cooling rate becomes larger, the width of each free CaO crystal in the CaO—$ZrO_2$ composition becomes smaller, and the cooling rate needs to be 10° C./sec or more.

It can also be seen that as the cooling rate becomes larger, slaking resistance is more improved.

In Comparative Example 5 produced at a cooling rate of 8° C./sec which is less than that in the method of the present invention, most of free CaO crystals had a width of greater than 50 μm, i.e., it failed to have the microstructure of the CaO—$ZrO_2$ composition of the present invention, and reflecting this, the number of dates was less than 1 in the result of the slaking test.

Experimental Example D of CaO—$ZrO_2$
Compositions

In Experimental Example D of CaO—$ZrO_2$ compositions, with regard to samples prepared by changing the size of a CaO raw material as one starting material of a CaO—$ZrO_2$ composition, an influence of the size of the CaO raw material on the width of each CaO crystal and slaking resistance was checked.

With regard to the starting materials (% by mass), as a CaO raw material (CaO source) quicklime having a particle size composition of about 3 mm or less (≤3 mm), greater than 3 mm to 5 mm, greater than 5 mm to 10 mm, or greater 10 mm (>10 mm) was used, and, as a $ZrO_2$ raw material ($ZrO_2$ source), unstabilized zirconia (vaterite) having a particle size composition of 10 mm or less (generally 3 mm or less) was used, wherein the mass ratio of the CaO raw material to the $ZrO_2$ raw material was set to 50/50.

In Experimental Example D, all samples were not subjected to carbonation treatment.

Slaking resistance was evaluated by the same method and criteria as those in Experimental Examples B and C.

The result is shown in Table 4 (FIG. 18).

It can be seen that as the particle size of the CaO raw material becomes smaller, the width of each free CaO crystal in the CaO—$ZrO_2$ composition becomes smaller.

It can also be seen that as the particle size of the CaO raw material becomes smaller, slaking resistance is more improved.

In Comparative Example 6 produced using a CaO raw material having a particle size of greater than 10 mm which is greater than the preferred range in the method of the present invention and at a cooling rate of 9° C./sec which is less than that in the method of the present invention, most of free CaO crystal had a width of greater than 50 μm, i.e., it failed to have the microstructure of the CaO—$ZrO_2$ composition of the present invention, and reflecting this, the number of dates was less than 1 in the result of the slaking test.

Even in the case where the particle size of the CaO raw material is greater than 10 mm, it may be possible to reduce the width of each free CaO crystal to 50 μm or less by employing, e.g., a technique of significantly increasing supply power (significantly raising temperature) or significantly increasing a holding time at high temperature. However, such a technique is undesirable because it is not industrially reasonable.

Experimental Example A of Refractory Materials

In Experimental Example A of refractory materials, an influence of the mass ratio of CaO/$ZrO_2$ among chemical components of a refractory material on alumina adhesion and slaking resistance was checked.

In Experimental Example A of refractory materials, two types of CaO—$ZrO_2$ compositions of the present invention each having a different content ratio of CaO to $ZrO_2$ were mainly used. In each of the CaO—$ZrO_2$ compositions, the width of each free CaO crystal is 50 μm or less.

Using each of the CaO—$ZrO_2$ compositions, the content of carbon (total amount of graphite and carbon as a binder) was set to 11.8% by mass, and the CaO/$ZrO_2$ mass ratio was variously changed.

Further, an influence of the CaO/$ZrO_2$ mass ratio in a case where an additional CaO-based raw material and $ZrO_2$-based raw material were used in combination with the CaO—$ZrO_2$ compositions of the present invention was also checked.

Samples of the refractory, except for a sample of Inventive Example 23, were subjected to carbonation treatment to form a carbonate film having a thickness of 0.5 μm to 2 μm on each particle of the CaO—$ZrO_2$ composition of the present invention and the additional CaO-based component.

With regard to the alumina adhesion, molten steel at a temperature of 1540° C. to 1580° C. was prepared such that it contained about 0.2% by mass of Al, and the amount of dissolved oxygen was set to less than 50 ppm, and each sample of the refractory material was immersed in the molten steel, and rotated (hereinafter referred to simply as "in-molten steel rotation test") to evaluate the amount of alumina adhesion onto the surface of the refractory material and the amount of wear of the surface of the refractory material.

A sample in which an adhesion rate in the in-molten steel rotation test was less than =5 μm/min, a sample in which the adhesion rate was—5~−10 μm/min or +5~+10 μm/min, and a sample in which the adhesion rate was greater than ±10 μm/min were evaluated as o (excellent, target value), Δ (allowable), and x (NG), respectively.

In the criteria for evaluation in the in-molten steel rotation test, "+" denotes alumina adhesion, and "−" denotes wear (reduction in size), alumina adhesion and corrosion-erosion resistance are simultaneously evaluated in the in-molten steel rotation test.

It should be noted that the term "wear" in the corrosion-erosion resistance evaluation" in the following Examples, is used as a concept which comprehensively expresses a situation where the size of a sample after the test is reduced, or similar situations, regardless of whether a mechanism causing damage is wear due to chemical reaction (corrosion due to lowering of a melting point, etc.), or wear due to mechanical damage such as abrasion (so-called erosion/abrasion).

FIG. 10 is a schematic explanatory diagram of an in-molten steel rotation test method, and FIGS. 11A and 11B illustrate a test piece for the in-molten steel rotation test, wherein FIG. 11A and FIG. 11B are, respectively, a front view and a bottom view of the test piece.

In in-molten steel rotation test, a test piece 10a held by a lower portion of a holder 11 is immersed in molten steel 13 in a crucible 12. The test piece 10a is formed in a rectangular parallelepiped shape and provided by a number of four, wherein the four test pieces 10a are fixed, respectively, to four faces of the lower portion of the holder 11 which has a quadrangular prism shape. Each of the test pieces 10a is inserted into a respective one of four recesses provided on the quadrangular prism-shaped holder 11, such that it can be pulled out and detached from the recess after completion of the test. An upper portion of the holder 11 is connected to a non-illustrated rotary shaft, and held by the rotary shaft such that it can be rotated about a longitudinal axis thereof as a rotation axis.

The holder 11 is made of a zirconia-carbon based refractory material and formed to have a square shape with a side of 40 mm in horizontal cross-section, and a longitudinal length of 160 mm. Each of the test pieces 10a has a portion exposed from the holder 11, wherein the exposed portion has a height dimension of 20 mm and a width dimention of 20 mm, and protrudes by 25 mm. The test piece 10a is attached to the holder such that a lower end face thereof is located above a lower end face of the holder by 10 mm. The crucible 12 is made of a refractory material and formed in a cylindrical shape having an inner diameter of 130 mm and a depth of 190 mm. The holder 11 is immersed at a depth of 50 mm or more. The crucible 12 is placed inside a high-frequency induction furnace 14. Although not illustrated, an upper surface of the crucible can be closed by a cover.

In the in-molten steel rotation test, after pre-heating the test pieces 10a by holding them just above the molten steel 13 for 5 minutes, the test pieces 10a are immersed in the molten steel 13 (low-carbon aluminum killed steel), and rotated at an average circumferential velocity of 1 m/sec at an outermost periphery of each of the test pieces 10a. During the test, an oxygen concentration of the molten steel 13 is kept in the range of 10 to 50 ppm by adding aluminum to the molten steel 13, and the temperature of the molten steel 13 is kept in the range of 1540 to 1580° C. After two hours, the test pieces 10a are pulled up, and, an adhesion and wear rate (μm/min) is measured.

In the measurement of the adhesion and wear rate, each of the test pieces 10a after completion of the test is detached from the holder, and cut along a horizontal plane with respect to the rotation axis (FIG. 12B). Then, respective lengths at 6 positions of the cut surface are measured at 3 mm pitch in a direction from an edge 10' of the test piece 10s toward the rotation axis, and averaged. Respective lengths at the same positions of the test piece 10a before the test are also measured and averaged, as illustrated in FIG. 12A. Then, the average value (μm) after the test is subtracted from the average value before the test, and the obtained value is divided by a test time of 120 minutes, to obtain the adhesion and wear rate (μm/min).

Although slaking resistance was evaluated by the same method as that in Experimental Examples B, C and D of CaO—ZrO$_2$ compositions, a target value of the number of days before the increase rate of weight reaches +1.5% was set to 3 or more in consideration of storage and distribution as a refractory product, and a sample in which the number of days was 3 or more was evaluated as ○ (acceptable), and a sample in which the number of days was less than 3 was evaluated as x (unacceptable).

As a comprehensible evaluation, a sample acceptable as a refractory material capable of solving the technical problem of the present invention was evaluated as ○, and a sample unacceptable as such a refractory material was evaluated as x.

The result is shown in Table 5 (FIGS. 19 and 20).

In Inventive Example in which the CaO/ZrO$_2$ mass ratio of the refractory material is in the range of 0.5 (Inventive Example 20) to 2.20 (Inventive Examples 22 and 23), it can be seen that alumina adhesion is significantly reduced, as compared with an alumina-graphite based refractory material (Comparative Example 11) which is a typical material for an immersion nozzle for casting, and there is no excessive wear. That is, it can be seen that a preferred balance between alumina adhesion resistance and wear resistance is obtained.

It can also be seen that, even in Inventive Example containing an additional ZrO$_2$ source in addition to the CaO—ZrO$_2$ composition of the present invention (Inventive Examples 19, 20 and 21), as long as the CaO/ZrO$_2$ mass ratio of the refractory material is 0.5 or more, a preferred balance between alumina adhesion resistance and wear resistance is obtained.

Further, it can be seen that, even in Inventive Example containing an additional CaO component in addition to the CaO—ZrO$_2$ composition of the present invention (Inventive Examples 22 and 23), as long as the CaO/ZrO$_2$ mass ratio of the refractory material is 2.20 or less, a preferred balance between alumina adhesion resistance and wear resistance is obtained.

In Comparative Example in which the CaO/ZrO$_2$ mass ratio is less than 0.5 (Comparative Examples 7 and 8), it can be seen that high alumina adhesion resistance cannot be obtained although slaking resistance is satisfactory.

In Comparative Example in which the CaO/ZrO$_2$ mass ratio is greater than 2.2 (Comparative Examples 9 and 10), it can be seen that wear is excessively large although alumina adhesion is relatively small.

Further, in Comparative Example 9 containing quicklime as a CaO source, it can be seen that slaking resistance is inferior, despite that the refractory material was subjected to carbonation treatment.

Experimental Example B of Refractory Materials 2

In Experimental Example B of refractory materials, an influence of the percent of a carbon component among chemical components of a refractory material on alumina adhesion, slaking resistance and thermal expansion was checked.

An influence of the range of the total amount of the CaO component and the ZrO$_2$ component was also checked in conjunction with increase or decrease of the carbon percent.

The slaking resistance and alumina adhesion were evaluated by the same method and criteria as those in Experimental Example A of refractory materials.

With regard to the thermal expansion, the thermal expansion rate (%) of the refractory material in a non-oxidizing atmosphere at 1000° C. was measured, and a sample having a thermal expansion rate of 0.5% or less was evaluated as ○ (target value, good), and a sample having a thermal expansion rate of greater than 0.5% was evaluated as x (NG).

A casting nozzle as a primary and important application of the refractory material of the present invention requires a high degree of thermal shock resistance, and generally uses an alumina-graphite based refractory material having a thermal expansion rate at 1000° C. of 0.5% or less.

It has been confirmed that a refractory material primarily containing the CaO—ZrO$_2$ composition of the present invention exhibits a similar level of thermal expansion as compared with commonly-used refractory materials.

In this regard, the present inventors have knowledge that in order to obtain a high degree of thermal shock resistance particularly in a casting nozzle, the thermal expansion rate thereof is more preferably 0.5% or less. Based on this knowledge, a target value of the thermal shock resistance was set to 0.5% or less.

As a comprehensible evaluation, a sample acceptable as a refractory material capable of solving the technical problem of the present invention, a sample which was not optimal but practically usable (capable of obtaining a certain level of improvement effect although it is difficult to obtain a significant effect), and a sample unacceptable as such a refractory material were evaluated as ○, Δ and x, respectively.

The result is shown in Table 6 (FIG. 21).

In Inventive Examples 16 and 24 to 29 in which the carbon component amount of the refractory material is in the range of 2 to 30, it can be seen that a preferred balance between alumina adhesion resistance and wear resistance is obtained.

It can be seen that when the carbon component amount of the refractory material is greater than 30% by mass (Comparative Example 12: 31% by mass) or less than 2% by mass (Comparative Example 14: 1% by mass), wear becomes excessively large. The former mainly causes melting of the carbon component itself into steel, abrasion, etc., and the latter mainly causes wear due to insufficient strength of the refractory material.

It can also be seen that when the refractory material contains the CaO component and the ZrO$_2$ component in a total amount of less than 65% by mass (Comparative Example 13 containing dolomite as an additional CaO component: 64% by mass) even if the carbon component amount of the refractory material is in the range of 2 to 30% by mass, wear becomes excessively large.

From the result of Experimental Example B of Refractory Materials, it can be seen that the carbon component amount needs to be in the range of 2 to 30% by mass, and in order to obtain a preferred balance between alumina adhesion resistance and wear resistance, the carbon component amount is preferably in the range of 2 to 25% by mass, more preferably 4 to 15% by mass.

Further, it can be seen that the total amount of the CaO component and the ZrO$_2$ component needs to be in the range of 65 to 98% by mass, In all Inventive and Comparative Examples, it can be seen that the thermal expansion rate (%) in a non-oxidizing atmosphere at 1000° C. is less than a minimum value of about 1.0% in a commonly-used conventional alumina-graphite based refractory material.

However, it can be seen that the preferable target value: 0.5% or less, is obtained when the carbon component amount is 4% by mass or more (Inventive Example 28). That is, from a viewpoint of the thermal expansion rate, the carbon component amount is also more preferably 4% by mass or more.

In Experimental Example B in which graphite and a residual carbon component of phenol resin are used as the carbon component, the amount of graphite as the carbon component becomes larger, the thermal expansion rate tends to become smaller.

Experimental Example C of Refractory Materials

In Experimental Example C of refractory materials, an oxide was incorporated in the refractory material of the present invention so as to form an inorganic film on the surface of the $CaO$—$ZrO_2$ composition contained in the refractory material, and an influence of the oxide on slaking resistance, alumina adhesion and thermal expansion was checked.

As the oxide, phosphorus pentoxide ($P_2O_5$), vanadium oxide ($V_2O_5$), titanium oxide ($TiO_2$) and boron oxide ($B_2O_3$) were selected.

Samples were produced in the same manner as that in Experimental Examples A and B of refractory materials, and evaluated by the same method as that in Experimental Examples A and B of Refractory Materials.

Although the slaking resistance was evaluated by the same method as that in Experimental Examples A and B of refractory materials, and a target (acceptable) value of the number of days before the increase rate of weight reaches +1.5% was set to 3 or more, a sample in which the number of days was 31 or more, a sample in which the number of days was 15 to 30, a sample in which the number of days was 3 to 14 were evaluated as ⊚ (excellent), ○ (good), Δ (allowable) and x (NG), respectively, considering that slaking resistance is significantly improved in this Experimental Example.

The alumina adhesion was evaluated in the same method and criteria as those in Experimental Examples A and B of refractory materials.

The thermal expansion was evaluated in the same method and criteria as those in Experimental Examples A and B of refractory materials. In the evaluation of thermal expansion in this Experimental Example, "x" means that a refractory material it is not suitable for use under conditions for casting of common aluminum killed steel. Thus, there is a possibility that such a refractory material evaluated as "x" is usable and suitable for use under steel casting conditions that the level of alumina adhesion is extremely high.

As a comprehensible evaluation, a sample acceptable as a refractory material capable of solving the technical problem of the present invention, a sample which was not optimal but practically usable (capable of obtaining a certain level of improvement effect although it is difficult to obtain a significant effect), and a sample unacceptable as such a refractory material were evaluated as ○, Δ and x, respectively.

The result is shown in Table 7 (FIGS. 22 and 23).

Even Inventive Examples 16 and 30 to 38 each containing any one of oxides selected from the group consisting of $P_2O_5$, $V_2O_5$, $TiO_2$ and $B_2O_3$ could obtain a significant effect in terms of slaking resistance, adherence resistance and wear resistance.

Inventive Example 39 containing a combination of $P_2O_5$, $V_2O_5$ and $TiO_2$ and Inventive Examples 40 and 41 containing a combination of $P_2O_5$, $V_2O_5$ and $TiO_2$ could also obtain a significant effect similar to that of the above Inventive Examples containing one of the oxides, in terms of slaking resistance, adherence resistance and wear resistance.

In Inventive Example containing the one or more oxides, it can be seen that a film composed of a compound of the one or more oxides and CaO tends to become thicker and have improved slaking resistance, as compared with Inventive Example which does no contain the one or more oxides.

However, in Inventive Example 35 containing one of the oxides in an amount of greater than 5% by mass, and Inventive Example 41 containing a combination of $P_2O_5$, $V_2O_5$ and $TiO_2$ in a total amount of greater than 5% by mass, it can be seen that corrosion-erosion resistance tends to deteriorate. When a tendency toward deterioration in corrosion-erosion resistance, i.e., toward enhanced self-fluxing ability is increased, involutions are likely to be generated of depending on steel grade. However, even such a refractory material can be used when suppression of aluminum adhesion is considered to be important, and steel quality is not strictly controlled. On the other hand, in steel grade that does not want incorporation of inclusions derived from a refractory material, it can be seen that the content of one of or a combination of two or more of the above oxides is preferably 5% by mass or less.

It can also be seen that if the content of the one or more oxides is greater than 5% by mass, thermal expansion tends to become larger. The reason that thermal expansion becomes larger is that the film composed of the compound of the one or more oxides and CaO becomes thicker, and an increased thickness of the film becomes greater than the thickness of a microspace, i.e., a thickness-wise shrinkage of the compound occurring during formation of the compound.

Thus, the thickness of the compound of CaO and one or more oxides selected from the group consisting of $B_2O_3$, $TiO_2$, $P_2O_5$, and $V_2O_5$ is preferably 0.1 μm to 15 μm.

However, when thermal expansion becomes larger, it becomes greater than the preferable target value: 0.5% or less, but the maximum value thereof is still less than thermal expansion of an alumina-graphite based refractory material as a conventional commonly-used refractory material, so that thermal shock resistance of Inventive Examples is superior to that of the conventional refractory material.

As above, it can be seen that the content of the one or more oxides is preferably 5.0% by mass or less.

Further, from the result in Table 7, it can be inferred that a refractory material containing a combination of $P_2O_5$, and $V_2O_5$ can obtain a similar effect to that of a refractory material containing a combination of $P_2O_5$, $V_2O_5$ and $TiO_2$, and in a refractory material containing a combination of any two of the three oxides, the content of the two oxides is also preferably 5.0% by mass or less.

Figure 3:
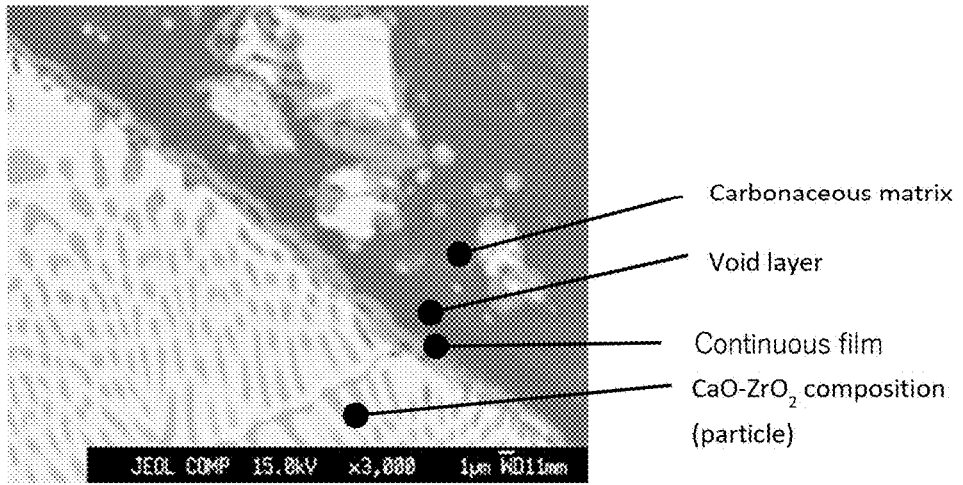
FIG. 3 is an example of a microstructural photograph by microscopic observation after heat treatment of a refractory material of the present invention.
Figure 4:
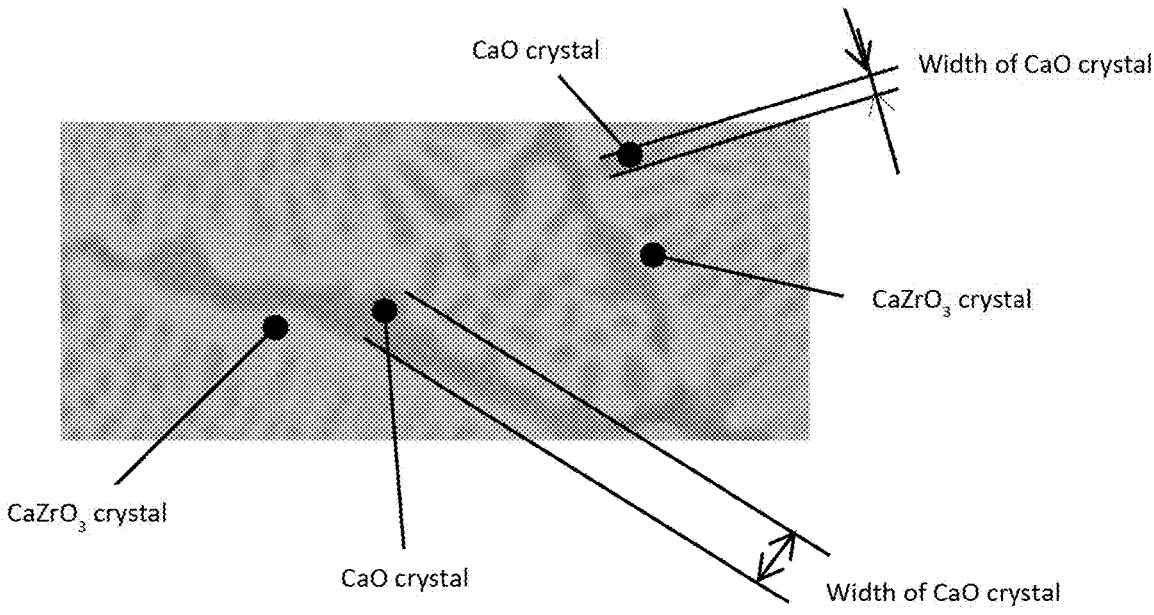
FIG. 4 is an enlarged photograph of a part of a CaO—ZrO$_2$ composition in FIG. 3.

FIG. 4 shows a microscope photograph of a cross-section of a $CaO$—$ZrO_2$ composition used for the refractory material of Inventive Example 38 (FIG. 3 is also a microscope photograph of the same $CaO$—$ZrO_2$ composition).

From FIG. 3, it can be seen that the refractory material of Inventive Example 38 has a continuous film on the surface of the $CaO$—$ZrO_2$ composition, and there is a void layer between the carbonaceous matrix and the film on the $CaO$—$ZrO_2$ composition.

Further, from FIG. 4, it can be seen that the $CaO$—$ZrO_2$ composition includes a eutectic microstructure of CaO crystals and $CaZrO_3$ crystals, wherein the width of each of the CaO crystals is 50 μm or less.

Experimental Example D of Refractory Materials

In Experimental Example D of refractory materials, the $CaO$—$ZrO_2$ composition contained in the refractory material after the completion of burning was further subjected to carbonation treatment to change the content of $CaCO_3$ in the composition, and an influence of the content of $CaCO_3$ on slaking resistance, alumina adhesion and thermal expansion was checked.

Samples were produced in the same manner as that in Experimental Examples A, B and C of refractory materials, and evaluated by the same method as that in Experimental Examples A, B and C of refractory materials.

Control of the content of $CaCO_3$ (which approximately correlates with the thickness of a $CaCO_3$ film) was performed by variously changing a carbon dioxide concentration, a treatment temperature, a treatment time, a carbon dioxide pressure, etc.

The slaking resistance, alumina adhesion and thermal expansion were evaluated by the same method and criteria as those in Experimental Example C of refractory materials.

Further, in this Experimental Example D, the state of the $CaCO_3$ film, i.e., whether or not the $CaCO_3$ film is in contact with at least a part of the inorganic compound film, and the thickness of the $CaCO_3$ film were observed by a microscope.

Further, a sample of the refractory material was immersed in hot metal at 1600° C., and a boiling state of the hot metal was visually observed. In this boiling test, a sample causing no boiling, a sample causing slight boiling, and a sample causing relatively strong boiling were evaluated as ⊚, ○ and Δ.

As a comprehensible evaluation, a sample acceptable as a refractory material capable of solving the technical problem of the present invention was evaluated as ○, and a sample unacceptable as such a refractory material was evaluated as x.

The composition of refractory raw materials and an evaluation result are shown in Table 8 (FIG. 24).

It can be seen that as the content of $CaCO_3$ becomes larger, the thickness of $CaCO_3$ carbonate film becomes larger, which causes a tendency toward increase in the "MS value" and decrease in thermal expansion. This reduction in thermal expansion provides improvement in thermal shock resistance.

However, in Inventive Example 46 in which the content of $CaCO_3$ is 3.0% by mass, boiling of the hot metal was slightly strong in the in-hot metal immersion test. This is a phenomenon caused by decomposition gas of a carbonate component, and may reduce quality of molten steel in casting operation or increase danger during the operation. Therefore, the content of $CaCO_3$ is preferably 2.5% by mass or less.

In any of Inventive Examples, the $CaCO_3$ film is in contact with at least a part of the inorganic compound film. However, in Inventive Example 42 in which the content of $CaCO_3$ is relatively small, a discontinuous part was partly observed. On the other hand, in Inventive Examples 43 to 46, the $CaCO_3$ film is in contact with at least a part of the inorganic compound film in an approximately continuous state.

Experimental Example E of Refractory Materials

In Experimental Example E of refractory materials, alumina adhesion and corrosion-erosion resistance was checked in a refractory material containing one or more selected from the group consisting of SiC, $B_4C$ and metal Si.

A production method for samples and an evaluation method for alumina adhesion (including corrosion-erosion resistance) are the same as those in Experimental Example D of refractory materials.

With regard to strength, the bending strength of a sample after heat treatment in a non-oxidizing atmosphere at 1000° C. was measured, and indicated by an index calculated on the assumption that the bending strength (2.5 MPa) of Comparative Example 16 is 100.

As a comprehensible evaluation, a sample acceptable as a refractory material capable of solving the technical problem of the present invention, a sample which was not optimal but practically usable (capable of obtaining a certain level of improvement effect although it is difficult to obtain a significant effect), and a sample unacceptable as such a refractory material were evaluated as ○, Δ and x, respectively.

The result is shown in Table 9 (FIG. 25).

It can be seen that in all Inventive Examples each containing one or more selected from the group consisting of SiC, $B_4C$ and metal Si, bending strength is improved.

Among Inventive Examples 47 to 50 each containing only SiC of the three metals, Inventive Example 49 containing SiC in an amount of 10% by mass had a slight tendency to wear in an alumina adhesion test, and Example 50 containing SiC in an amount of 10.5% by mass had large wear.

From this result, in continuous casting of common aluminum killed steel or the like, it can be seen that the content of SiC is preferably 10% by mass or less.

From the results of Inventive Examples 51 to 54 each using either one or both of $B_4C$ and metal Si, it can be seen that although a slight tendency to wear can be caused by containing the one or more metals, it can be suppressed by setting a total amount of the one or more metals to 2% by mass or less.

From the results of Inventive Examples 55 and 56 each using all of SiC, $B_4C$ and metal Si, it can be seen that a tendency to wear can be suppressed as long as the content of SiC is 10% by mass or less, and a total amount of $B_4C$ and metal Si is 2% by mass or less.

When the content of SiC, each content of or a total amount of $B_4C$ and metal Si, or a total amount of SiC, $B_4C$ and metal Si, is greater than the preferable content, it is not that the resulting refractory material cannot be used as a refractory material for casting, but the refractory material can be used under steel casting conditions the level of alumina adhesion is extremely high, or by adjusting the content of the one or more metals depending on the level of alumina adhesion, and can be rather suitable for use under such conditions.

Experimental Example F of Refractory Materials

In Experimental Example F of refractory materials, an influence of the refractory material of the present invention on quality of molten steel (level of molten steel contamination) was checked, in comparison with other conventional refractory materials A carbon component in a refractory material transfers into steel during immersion in molten steel. The level of the transfer appears as a change in the content of carbon component in steel. This change in the in-steel carbon content was obtained by measuring the in-steel carbon content before and after a test using a device and a sample-setting method in FIGS. 14A and 14B according to a device and method for the alumina adhesion test similar to those in the Experimental Examples A to E of refractory materials. Then, a sample in which the change (increase) in the in-steel carbon content was less than 50 ppm was evaluated as ○ (Good), and a sample in which the change (increase) in the in-steel carbon content was 50 ppm or more was evaluated as x (NG).

Further, in this Experimental Example F, the alumina adhesion test was carried out to measure the level of alumina adhesion, and the level of wear.

Results of these evaluation were taken together, a sample meeting the requirements of the CaO—ZrO$_2$ composition was evaluated as ○ (acceptable), and a sample which does not meet any one of the requirements was evaluated as x (unacceptable).

The composition of refractory raw materials and an evaluation result are shown in Table 10 (FIG. 26).

It can be seen that in Inventive Example 57, the change in the in-steel carbon content is significantly small, in comparison with any of the conventional refractory materials. Here, Inventive Example 57 is based on the aforementioned Inventive Example 16.

On the other hand, in Comparative Examples 15 and 16 (conventional refractory materials) directed to adhesion resistance, the change in the in-steel carbon content is significantly large, and wear of the refractory material in the alumina adhesion test tends to become large.

In Comparative Example 11 as a commonly-used refractory material for casting devoid of an adhesion resistant function, and Comparative Examples 17 to 19 mainly directed to high corrosion-erosion resistance, the change in the in-steel carbon content is significantly large, and the level of alumina adhesion in the alumina adhesion test tends to become high.

LIST OF REFERENCE SIGNS

10*a*: test piece
10*b*: test piece
10': end face
11: holder
12: crucible
13: molten steel
14: high-frequency induction furnace
20: refractory material of present invention
21: powder line material (back-side refractory material)
22: nozzle body material (back-side material)
22G: nozzle body material (gas-permeable refractory material)
22S: space (gas passage, accumulation chamber)

A: upper nozzle
B: sliding nozzle plate
C: lower nozzle
D: long nozzle
E: long stopper
F: immersion nozzle
G: lining refractory material

The invention claimed is:

1. A CaO—ZrO$_2$ composition containing a CaO component in an amount of 40% by mass to 60% by mass, wherein a mass ratio of the CaO component to a ZrO$_2$ component is 0.67 to 1.5, and wherein the CaO—ZrO$_2$ composition includes a eutectic microstructure of CaO crystals and CaZrO$_3$ crystals, wherein a width of each of the CaO crystals observable in a cross-sectional microstructure is 50 μm or less.

2. The CaO—ZrO$_2$ composition as claimed in claim 1, wherein the width of each of the CaO crystals is 20 μm or less.

3. The CaO—ZrO$_2$ composition as claimed in claim 1, wherein a CaCO$_3$ film having a thickness of 0.1 μm to 5 μm is formed on a surface of the CaO—ZrO$_2$ composition, such that it continuously lies over surfaces of the CaO crystals and the CaZrO$_3$ crystals.

4. A method of producing the CaO—ZrO$_2$ composition as claimed in claim 1, comprising the steps of:

heating a CaO raw material and a ZrO$_2$ raw material to a molten state at a temperature equal to or greater than that of a liquidus line for a composition of a CaO component and a ZrO$_2$ component; and cooling the CaO raw material and the ZrO$_2$ raw material from the molten state to a temperature of a solidus line for the composition at a cooling rate of 10° C./sec or more.

5. The method as claimed in claim 4, wherein:

the CaO raw material is one or more selected from the group consisting of quicklime, and CaO compounds each of which becomes CaO, except for unavoidable impurities, at a temperature during melting, the CaO raw material having a size of 10 mm or less; and the ZrO$_2$ raw material is one or more selected from the group consisting of: CaO-stabilized ZrO$_2$, CaO-partially stabilized ZrO$_2$, and unstabilized ZrO$_2$, the ZrO$_2$ raw material having a size of 10 mm or less.

* * * * *